United States Patent [19]

Lin

[11] Patent Number: 5,287,481
[45] Date of Patent: Feb. 15, 1994

[54] AUTOMATIC CACHE FLUSH WITH READABLE AND WRITABLE CACHE TAG MEMORY

[75] Inventor: Fong-Lu Lin, San Jose, Calif.

[73] Assignee: OPTi, Inc., Santa Clara, Calif.

[21] Appl. No.: 878,730

[22] Filed: May 4, 1992

Related U.S. Application Data

[63] Continuation-in-part of Ser. No. 812,074, Dec. 19, 1991.

[51] Int. Cl.⁵ .................. G06F 12/00; G06F 13/00
[52] U.S. Cl. ..................... 395/425; 364/DIG. 1; 364/243.41; 395/400
[58] Field of Search .................. 395/425, 400; 364/200 MS File, 900 MS File

[56] References Cited

U.S. PATENT DOCUMENTS

| | | | |
|---|---|---|---|
| 4,493,026 | 1/1985 | Olnowich | 364/200 |
| 4,831,520 | 5/1989 | Rubinfeld et al. | 395/325 |
| 4,831,581 | 5/1989 | Rubinfeld | 395/325 |
| 5,091,845 | 2/1992 | Rubinfeld | 395/425 |
| 5,091,846 | 2/1992 | Sachs et al. | 364/200 |
| 5,095,428 | 3/1992 | Walker et al. | 364/200 |
| 5,097,532 | 3/1992 | Borup et al. | 364/200 |
| 5,119,485 | 6/1992 | Ledbetter, Jr. et al. | 364/200 |
| 5,157,774 | 10/1992 | Culley | 364/200 |
| 5,182,802 | 1/1993 | Dillard | 395/425 |

OTHER PUBLICATIONS

OPTi, Inc. HiD/386 AT Chipset High Integration Direct Mapped Cache AT 82C381/82C382D-25/33 Data Book (Nov. 1989).

Buchanan, "A Highly Integrated VLSI Chip Set For EISA System Design", Silicon Valley Personal Computer Design Conference Proceedings, Jul. 9-10, 1991, pp. 293-306.

Primary Examiner—Joseph L. Dixon
Assistant Examiner—Frank J. Asta
Attorney, Agent, or Firm—Fliesler, Dubb, Meyer & Lovejoy

[57] ABSTRACT

According to the invention, a chipset is provided which powers up in a default state with cacheing disabled and which writes permanently non-cacheable tags into tag RAM entries corresponding to memory addresses being read while cacheing is disabled. Even though no "valid" bit is cleared, erroneous cache hits after cacheing is enabled are automatically prevented since any address which does match a tag in the tag RAM, is a non-cacheable address and will force retrieval directly from main memory anyway. Two cache tag test modes are also described, as is a cache sizing algorithm.

8 Claims, 17 Drawing Sheets

CONTROL REGISTER 1
INDEX: 20h

FIG. 2

| BIT | FUNCTION | FAULT |
|---|---|---|
| 7-6 | REVISION OF 82C391 AND IS READ-ONLY | 0 0 |
| 3 | SINGLE ALE ENABLE-SYSC WILL ACTIVATE SINGLE ALE INSTEAD OF MULTIPLE ALEs DURING BUS CONVERSION CYCLE IF THIS BIT IS ENABLED. 0=DISABLE 1=ENABLE | 0 |
| 2 | EXTRA AT CYCLE WAIT STATE ENABLE. INSERT ONE EXTRA WAIT STATE IN STANDARD AT BUS CYCLE. 0=DISABLE 1=ENABLE | 0 |
| 1 | KEYBOARD AND FAST RESET CONTROL-TURN ON THIS BIT REQUIRES "HALT" INSTRUCTION TO BE EXECUTED BEFORE SYSC GENERATES CPURST..FROM KEYBOARD RESET 0=DISABLE 1=ENABLE | 0 |
| 0 | FAST RESET ENABLE-ALTERNATIVE FAST CPU RESET. 0=DISABLE 1=ENABLE | 0 |

CONTROL REGISTER 2
INDEX: 21h

FIG. 3

| BIT | FUNCTION | DEFAULT |
|---|---|---|
| 7 | MASTER MODE BYTE SWAP ENABLE 0=DISABLE 1=ENABLE | 0 |
| 6 | FAST KEYBOARD RESET DELAY CONTROL 0=GENERATE RESSET PULSE 2 US LATER 1=GENERATE RESET PULSE IMMEDIATELY | 0 |
| 5 | PARITY CHECK 0=DISABLE 1=ENABLE | 0 |
| 4 | CACHE ENABLE 0=DISABLE 1=ENABLE | 0 |
| 3-2 | CACHE SIZE<br>3 2 CACHE SIZE<br>0 0 32KB<br>0 1 64KB<br>1 0 128KB<br>1 1 256KB | 00 |
| 1-0 | CACHE WRITE CONTROL<br>1 0 WRITE CONTROL<br>0 0=1 WAIT STATE, WRITE HIT CYCLE<br>0 1=0 WAIT STATE FOR 32KX8 SRAMs WHICH MAKES 128K OR 256K CACHE<br>1 0=NOT USED<br>1 1=0 WAIT STATE FOR 8KX8 SRAMs WHICH MAKES 32K OR 64K CHACHE<br>NOTICE CHACHE READ ALWAYS 0 WAIT STATE | 00 |

SHADOW RAM CONTROL REGISTER I
INDEX: 22h

FIG. 4

| BIT | FUNCTION | DEFAULT |
|---|---|---|
| 7 | ROM ENABLE AT F0000-FFFFF<br>1=READ FROM ROM, WRITE TO DRAM.<br>0=READ FROM DRAM AND DRAM IS WRITE-PROTECTED | 1 |
| 6 | SHADOW RAM AT D0000h-DFFFFh AREA<br>00=DISABLE 1=ENABLE | 0 |
| 5 | SHADOW RAM AT E0000h-EFFFFh AREA<br>0=DISABLE SHADOW, ENABLE ROMCS#<br>1=ENABLE SHADOW, DISABLE ROMCS# | 0 |
| 4 | SHADOW RAM AT D0000h-DFFFFh AREA WRITE PROTECT ENABLE<br>0=DISABLE 1=ENABLE | 0 |
| 3 | SHADOW RAM AT E0000h-EFFFFh AREA WRITE PROTECT ENABLE<br>0=DISABLE 1=ENABLE | 0 |
| 2 | HIDDEN REFRESH-REFRESH ENABLE (WITHOUT HOLDING CPU)<br>1=DISABLE 0=ENABLE | 1 |
| 1 | UNUSED BIT | 0 |
| 0 | SLOW REFRESH ENABLE (4 TIMES SLOWER THAN THE NORMAL REFRESH)<br>0=DISABLE 1=ENABLE | 0 |

SHADOW RAM CONTROL REGISTER II
INDEX: 23h

FIG. 5

| BIT | FUNCTION | DEFAULT |
|---|---|---|
| 7 | SHADOW RAM AT EC000h-EFFFFh AREA<br>0=DISABLE 1=ENABLE | 0 |
| 6 | SHADOW RAM AT E8000h-EBFFFh AREA<br>0=DISABLE 1=ENABLE | 0 |
| 5 | SHADOW RAM AT E4000h-E7FFFh AREA<br>0=DISABLE 1=ENABLE | 0 |
| 4 | SHADOW RAM AT E0000h-E3FFFh AREA<br>0=DISABLE 1=ENABLE | 0 |
| 3 | SHADOW RAM AT DC000h-DFFFFh AREA<br>0=DISABLE 1=ENABLE | 0 |
| 2 | SHADOW RAM AT D8000h-DBFFFh AREA<br>0=DISABLE 1=ENABLE | 0 |
| 1 | SHADOW RAM AT D4000h-D7FFFh AREA<br>0=DISABLE 1=ENABLE | 0 |
| 0 | SHADOW RAM AT D0000h-D3FFFh AREA<br>0=DISABLE 1=ENABLE | 0 |

SHADOW RAM CONTROL REGISTER III
INDEX: 26h

| BIT | FUNCTION | DEFAULT |
|---|---|---|
| 6 | SHADOW RAM COPY ENABLE FOR ADDRESS AREA C0000h-EFFFFh<br>0=READ/WRITE at AT BUS<br>1=READ FROM AT BUS AND WRITE INTO SHADOW RAM | 0 |
| 5 | SHADOW WRITE PROTECT AT ADDRESS AREA C0000h-CFFFFh<br>0=WRITE PROTECT DISABLE<br>1=WRITE PROTECT ENABLE | 1 |
| 4 | SHADOW RAM ENABLE AT C0000h-CFFFFh AREA<br>0=DISABLE 1=ENABLE | 1 |
| 3 | ENABLE SHADOW RAM AT CC000h-CFFFF AREA<br>0=DISABLE 1=ENABLE | 0 |
| 2 | ENABLE SHADOW RAM AT C8000h-CBFFF AREA<br>0=DISABLE 1=ENABLE | 0 |
| 1 | ENABLE SHADOW RAM AT C4000h-C7FFFh AREA<br>0=DISABLE 1=ENABLE | 0 |
| 0 | ENABLE SHADOW RAM AT C0000h-C3FFFh AREA<br>0=DISABLE 1=ENABLE | 0 |

FIG. 6

DRAM CONTROL REGISTER I
INDEX: 24h

FIG. 7

| BIT | FUNCTION | DEFAULT |
|---|---|---|
| 7 | 2 BANK MODE. WHEN ENABLED, ONLY FIRST TWO BANKS(BANK 0 AND BANK 1) ARE USED. 1=DISABLE 0=ENABLE | 0 |
| 6-4 | DRAM TYPES USED FOR BANK0 AND BANK1. SEE THE FOLLOWINNG TABLE | 000 |
| 3 | NOT USED | 0 |
| 2-0 | DRAM TYPES USED FOR BANK 2 AND BANK 3. SEE THE FOLLOWING TABLE. BIT 2-0 ARE NOT USED WHEN BIT 7 IS SET TO "0". | 111 |

FIG. 7A

| BITS 7 6 5 4 | BANK 0 | BANK 1 |
|---|---|---|
| 1 0 0 0 | 1M | X |
| 1 0 0 1 | 1M | 1M |
| 1 0 1 0 | 1M | 4M |
| 1 0 1 1 | 4M | 1M |
| 1 1 0 0 | 4M | X |
| 1 1 0 1 | 4M | 4M |
| 1 1 1 X | X | X |
| 0 0 0 0 | 256K | X |
| 0 0 0 1 | 256K | 256K |
| 0 0 1 0 | 256K | 1M |

FIG. 7B

| BITS 7 2 1 0 | BANK 2 | BANK 3 |
|---|---|---|
| 1 0 0 0 | 1M | X |
| 1 0 0 1 | 1M | 1M |
| 1 0 1 0 | X | X |
| 1 0 1 1 | 4M | 1M |
| 1 1 0 0 | 4M | X |
| 1 1 0 1 | 4M | 4M |
| 1 1 1 X | X | X |

DRAM CONTROL REGISTER II
INDEX: 25h

| BIT | FUNCTION | DEFAULT |
|---|---|---|
| 7-6 | READ CYCLE WAIT STATE<br>7 6 ADDITIONAL WAIT STATES<br>0 0 NOT USED<br>0 1 0<br>1 0 1<br>1 1 2<br>NOTE: BASE WAIT STATES IS "3". | 11 |
| 5-3 | WRITE CYCLE WAIT STATE<br>5 4 3 ADDITIONAL WAIT STATES<br>0 0 0 0<br>0 1 0 1<br>1 0 0 2<br>1 1 0 3<br>0 0 1 NOT USED<br>NOTE: BASE WAIT STATE IS "2". | 110 |
| 2-0 | UNUSED | 00 |

*FIG. 8*

CONTROL REGISTER 3
INDEX: 27h

| BIT | FUNCTION | DEFAULT |
|---|---|---|
| 7 | ENABLE NON-CACHEABLE FUNCTION<br>1=ALL DRAM ARE NON-CACHEABLE<br>0=DRAM CACHEABLE RANGE CONTROLLED BY BIT 3-0 | 1 |
| 6-5 | UNUSED | 00 |
| 4 | VIDEO BIOS AT C0000h-C8000h AREA NON-CACHEABLE<br>0=CACHEABLE, 1=NON CACHEABLE | 1 |
| 3-0 | CACHEABLE ADDRESS RANGE FOR LOCAL MEMORY. | 0001 |

FIG. 9

| BITS<br>3 2 1 0 | CACHEABLE ADDRESS RANGE |
|---|---|
| 0 0 0 0 | 0-64Mb |
| 0 0 0 1 | 0-4Mb |
| 0 0 1 0 | 0-8Mb |
| 0 0 1 1 | 0-12Mb |
| 0 1 0 0 | 0-16Mb |
| 0 1 0 1 | 0-20Mb |
| 0 1 1 0 | 0-24Mb |
| 0 1 1 1 | 0-28Mb |
| 1 0 0 0 | 0-32Mb |
| 1 0 0 1 | 0-36Mb |
| 1 0 1 0 | 0-40Mb |
| 1 0 1 1 | 0-44Mb |
| 1 1 0 0 | 0-48Mb |
| 1 1 0 1 | 0-52Mb |
| 1 1 1 0 | 0-56Mb |
| 1 1 1 1 | 0-60Mb |

FIG. 9A

NON-CACHEABLE BLOCK 1 REGISTER I-
INDEX: 28h

| BIT | FUNCTION | DEFAULT |
|---|---|---|
| 7-5 | SIZE OF NON-CACHEABLE MEMORY BLOCK 1, SEE FOLLOWING TABLE | 100 |
| 4-2 | UNUSED | 000 |
| 1-0 | ADDRESS BITS OF A25 AND A24 OF NON-CACHEABLE MEMORY BLOCK 1 | 00 |

FIG. 10A

NON-CACHEABLE BLOCK 1 REGISTER II
INDEX: 29h

| BIT | FUNCTION | DEFAULT |
|---|---|---|
| 7-0 | ADDRESS BIT A23-A16 OF NON-CACHEABLE MEMORY BLOCK 1 | 0001xxxx |

FIG. 10B

| 7 6 5 | BLOCK SIZE |
|---|---|
| 0 0 0 | 64K |
| 0 0 1 | 128K |
| 0 1 0 | 256K |
| 0 1 1 | 512K |
| 1 X X | DISABLED |

FIG. 10C

| BLOCK SIZE | VALID STARTING ADDRESS BITS | | | | | | | |
|---|---|---|---|---|---|---|---|---|
| | A23 | A22 | A21 | A20 | A19 | A18 | A17 | A16 |
| 64K | V | V | V | V | V | V | V | V |
| 128K | V | V | V | V | V | V | V | X |
| 256K | V | V | V | V | V | V | X | X |
| 512K | V | V | V | V | V | X | X | X |

FIG. 10D

| 21h (3) | 21h (2) | CACHE SIZE | BITS USED TO ADDRESS TAG SRAM | TAG(7:3) | TAG(2) | TAG(1) | TAG(0) |
|---|---|---|---|---|---|---|---|
| 0 | 0 | 32KB | CA(14:4) | CA(22:18) | CA(17) | CA(16) | CA(15) |
| 0 | 1 | 64KB | CA(15:4) | CA(22:18) | CA(17) | CA(16) | CA(23) |
| 1 | 0 | 128KB | CA(16:4) | CA(22:18) | CA(17) | CA(24) | CA(23) |
| 1 | 1 | 256KB | CA(17:4) | CA(22:18) | CA(25) | CA(24) | CA(23) |

AUTOMATIC CACHE FLUSH WITH READABLE AND WRITABLE CACHE TAG MEMORY

CROSS-REFERENCED TO RELATED APPLICATIONS

This is continuation-in-part of U.S. patent application Ser. No. 07/812,074, filed Dec. 19, 1991, entitled "Automatic Cache Flush", inventor David Lin. The related application is assigned to the assignee of the present application and is incorporated herein by reference.

BACKGROUND

1. Field of the Invention

The invention relates to IBM PC AT-compatible computer architectures, and more particularly, to enhancements thereof for cache memory management.

2. Description of Related Art

The IBM PC AT computer architecture is an industry standard architecture for personal computers and is typically built around a CPU such as an 80286, 80386SX, 80386DX, or 80486 microprocessor manufactured by Intel Corporation. The CPU is coupled to a local bus, capable of performing memory accesses and data transfers at high rates of speed (i.e., on the order of 10-50 MHz with today's technology). The local bus includes 16 or 32 data lines, a plurality of memory address lines, and various control lines.

The typical IBM PC AT-compatible platform also includes DRAM main memory, and in many cases a timer, a real-time clock, and a cache memory, all coupled to the local bus.

The typical IBM PC AT-compatible computer also includes an I/O bus which is separate and distinct from the local bus. The I/O bus, an AT bus, an ISA bus or an EISA bus, is coupled to the local bus via certain interface circuitry. The I/O bus includes 16 or 32 data lines, a plurality of I/O address lines, as well as control lines. The I/O address space is logically distinct from the memory address space and if the CPU desires to access an I/O address, it does so by executing a special I/O instruction. The interface circuitry recognizes the I/O signals thereby generated by the CPU, performs the desired operation over the I/O bus, and if appropriate, returns results to the CPU over the local bus.

In practice, some I/O addresses may reside physically on the local bus and some memory addresses may reside physically on the I/O bus. The interface circuitry is responsible for recognizing that a memory or I/O address access must be emulated by an access to the other bus, and is responsible for doing such emulation. For example, a ROM (or EPROM) BIOS may be physically on the I/O bus, but actually form part of the local memory address space. During system boot, when the CPU sends out a non-I/O address which is physically within the ROM BIOS, the interface circuitry recognizes such, enables a buffer which couples the address onto the I/O bus, and activates the chip select for the ROM. The interface circuitry then assembles a data word of the size expected by the CPU, from the data returned by the ROM, and couples the word onto the local bus for receipt by the CPU. In many systems, at some point during the ROM-based boot-up procedure, the ROM BIOS is copied into equivalent locations in the DRAM main memory and thereafter accessed directly. The portion of DRAM main memory which receives such portions of the BIOS is sometimes referred to as "shadow RAM."

More specifically, in the standard PC AT architecture, the logical main memory address space is divided into a low memory range (0h-9FFFFh), a reserved memory range (A0000h-FFFFFh) and an extended memory range (100000h-FFFFFFh). In a typical system the system ROM BIOS is located logically at addresses F0000h-FFFFFh, and is located physically on the I/O bus. Additional system ROM BIOS may be located in expansion sockets at addresses E0000h-EFFFFh, physically located on the I/O bus. Addresses C0000h-EFFFFh contain ROM BIOS portions for specific add-on cards and are located physically on their respective cards on the I/O bus. Addresses A0000h-BFFFFh contain the video buffer, located physically on a video controller on the I/O bus. The video buffer may be accessible directly over the local bus. Duplicate memory space is typically provided in DRAM on the local bus for addresses C0000h-FFFFFh, and the user of the system can select which portions of the ROM BIOS are to be "shadowed" by being copied into the duplicate DRAM space during boot-up. Subsequent accesses to "shadowed" portions of the BIOS are to the DRAM copy, which is typically much faster than accesses to the ROM copy. As used herein, the term "secondary memory" refers to any storage elements present in the system, which are accessible in the main memory address space.

When an Intel 80×86 microprocessor first powers up, it begins by executing the instruction located 16 bytes from the highest memory address. For the 8086/8088, this address is FFFF0h. For the 80286, it is FFFFF0h, for the 80386 it is FFFFFFF0h, and for the 80486 it is FFFFFFF0h. Typical IBM PC AT-compatible systems have a jump instruction at this address, to the beginning of a power-on self-test (POST) routine in the system ROM BIOS. The POST tests the microprocessor, memory, and other hardware components for presence and reliability, and also initializes various interrupt vector table entries with default values pointing to handler routine within the system BIOS.

As part of its duties, the POST scans for add-on ROM BIOS modules beginning at every 2 k byte increment from address C0000h to DFFFFh. At each increment, it checks for a signature of 55 h at offset 0, and AAh at offset 1 to indicate a valid add-on ROM BIOS module. The byte at offset 2 then contains the length of the BIOS module (measured in 512 byte blocks), and offset 3 begins the executable code for the module. The POST performs a checksum on all the bytes in the module, which should always yield a value of 00h in each of the low-order two bytes, and then executes a "far call" instruction to the offset 3 byte to permit the module to perform its own initialization. The module executes a "far return" instruction to return to the POST. The portion of the POST which checks for ROM BIOS modules is known as BIOS sizing.

The BIOS sizing operation in the POST also checks for an expansion system BIOS ROM in the range E0000h-EFFFFh. The POST checks for a valid signature at offsets 0 and 1 at each increment, performs a checksum verification for the modules it finds, and executes a far call to the offset 3 byte of the module to permit the module to perform its own initialization. An overall checksum verification is also perform on the main system BIOS range F0000h-FFFFFh.

The POST also checks the integrity of all the memory in the system from address 0h to 9FFFFh and 100000h to the top of memory by writing known data to these addresses and then reading it back. The POST also checks the integrity of whatever video memory is present in addresses A0000h-BFFFFh by the same or a similar method.

In addition to the above elements of a standard PC AT-compatible system, a keyboard controller typically is also coupled to the I/O bus, as is a video display controller. A typical IBM PC AT-compatible system may also include a DMA controller which permits peripheral devices on the I/O bus to read or write directly to or from main memory, as well as an interrupt controller for transmitting interrupts from various add-on cards to the CPU. The add-on cards are cards which may be plugged into slot connectors coupled to the I/O bus to increase the capabilities of the system.

General information on the various forms of IBM PC AT-compatible computers can be found in IBM, "PC/AT Technical Reference Manual" (1985); Sanchez, "IBM Microcomputers: A Programmer's Handbood" (McGraw-Hill: 1990) and Solari, "AT Bus Design" (San Diego: Annabooks, 1990). See also the various data books and data sheets published by Intel Corporation concerning the structure and use of the iAPX-86 family of microprocessors, including the "386 DX Microprocessor", data sheet, published by Intel Corporation (1990), and "i486 TM Processor Hardware Reference Manual", published by Intel Corporation (1990). All the above references are incorporated herein by reference.

Recently, efforts have been made to reduce the size and improve the manufacturability of PC AT-compatible computers. Specifically, efforts have been made to minimize the number of integrated circuit chips required to build such a computer. Several manufacturers have developed "PC AT chipsets", which integrate a large amount of the I/O interface circuitry and other circuitry onto only a few chips. An example of such a chipset for an ISA architecture is the 386WT PC/AT chipset manufactured by OPTi, Inc., Santa Clara, Calif., made up of the OPTi 82C381, 82C382 and 82C206. Examples of such a chipset for an EISA architecture are described in Intel, "82350 EISA Chip set" (1990) and in Intel, "82350DT EISA Chip Set" (1992), both available from Intel Corp., Santa Clara, Calif.; and in Buchanan, "A Highly Integrated VLSI Chip Set For EISA System Design," [Need Journal and date], pp. 293-[?][this is the article re TI chipset].

Several of these chipsets, including the 386 WT chipset, implement a direct mapped cache memory to improve performance. The use of a small, high speed cache in a computer design permits the use of relatively slow but inexpensive DRAM for the large main memory space, by taking advantage of the "property of temporal locality," i.e., the property inherent in most computer programs wherein a memory location referenced at one point in time is very likely to be referenced again soon thereafter. Descriptions of the various uses of and methods of employing caches appear in the following articles: Kaplan, "Cache-based Computer Systems," *Computer*, March, 1973 at 30-36; Rhodes, "Caches Keep Main Memories From Slowing Down Fast CPUs," *Electronic Design*, Jan. 21, 1982, at 179; Strecker, "Cache Memories for PDP-11 Family Computers," in Bell, "*Computer Engineering*" (Digital Press), at 263-67, all incorporated herein by reference.

See also the description at pp. 6-1 through 6-11 of the "i486 Processor Hardware Reference Manual" mentioned above.

In general, a direct mapped cache memory comprises a high speed data RAM and a parallel high speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ blocks in main memory. The identity of the main memory block that the line came from is stored in the i'th location in the tag RAM. Tag RAM typically also contains a "valid" bit corresponding to each entry, indicating whether the tag and data in that entry are valid.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto the data bus. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Aspects of the present invention apply to each of the above cache architectural variations. Caches may also be "sector buffered" or "sub-block" type caches, in which several cache data lines, each with its own valid bit, correspond to a single cache tag RAM entry. Aspects of the invention may apply to sector buffered caches as well, especially to the extent that elimination of the valid bits effectively converts such caches to non-sector buffered caches with a line size equal to the former sector size.

In PC AT-compatible computers, the chipset performs all the management functions for the cache, while the cache data memory itself is located in SRAM off-chip. The tag memory is also located off-chip in a tag RAM. The user can specify, through a user setup program which programs registers in the chipset, which memory address ranges are to be cacheable and which are not. Due to the special nature of addresses A000-0h–BFFFFh and C8000h–FFFFFh, these addresses are never cacheable in a typical chipset.

On system power-up, the external cache data and tag RAM both contain random data, including in the valid bit. Unless special precautions are taken, therefore, one or more lines of random data in the cache erroneously may appear to the chipset to contain valid information. One solution to this problem might be to use a dedicated tag RAM chip which has a "flush" pin. The CY7B181 chip manufactured by Cypress Semiconductor Corp. is one such chip. The flush pin would be connected to the system reset line to force the tag RAM to invalidate all its entries before the first instruction fetch by the CPU. Dedicated tag RAM chips are expensive, however, and preferably avoided in PC AT-compatible computers.

In some chipsets, the problem is solved using standard SRAM chips to store tag RAM. These chipsets power up with cacheing disabled, and special routines in the setup program, or in a driver, invalidate each cache tag entry before enabling cacheing. Since the tag RAM is not directly accessible by the CPU in PC AT architectures, however, this technique usually requires the provision of special registers in the chipset through which the accesses can be made. It also requires specialized setup program code to accomplish the flush, which is undesirable since industry standard BIOS ROMs generally cannot be used. The technique also imposes a small time delay in the boot procedure which it would be desirable to avoid.

In the 386 WT chipset, a dedicated tag RAM was used which included an "invalidate" input pin to clear the valid bit for the entry currently being addressed. The chipset itself included an "invalidate" output for connection to that pin, and the chipset solved the power-up cache-flush problem by powering up in a default state with cacheing disabled and including logic to activate the invalidate output whenever cacheing was disabled. Thus, when the POST performed its standard memory test operation, which included (among other things) reads from all the bytes in a memory address range much larger than the maximum allowed cache size of 256 k bytes, all the tag RAM entries were invalidated automatically. This solution avoided the need for any special setup program routines, but still required the use of expensive dedicated tag RAM.

Another problem which occurs in PC AT-compatible computers arises because there is no way to directly read or write information in the cache tag RAM. In the typical PC AT-compatible computer, the data pins of the tag RAM are permanently coupled to receive input from the high-order address leads of the local bus as explained above, and are permanently coupled to provide output to a tag match comparator. Cache tag entries have no corresponding address in the main memory or I/O address space. For diagnostic purposes, however, it would be desirable to be able to write any desired data to a selected tag RAM entry, and also to read the data currently in a tag RAM entry. This capability would be desirable so that, for example, the POST could test and size the cache much like it does so for DRAM main memory.

SUMMARY OF THE INVENTION

Accordingly, it is an object of the present invention to address the power-up cache-flush problem while avoiding some or all of the problems raised by prior solutions.

It is another object of the present invention to provide a way of flushing a cache tag RAM during power-up initialization without using dedicated tag RAM chips and without modifications to standard setup program routines.

It is another object of the present invention to eliminate the "valid" bit from tag RAMs implemented with standard SRAMs in PC AT-compatible computer architectures.

It is another object of the present invention to provide a method for writing desired information into a cache tag entry and for reading the information from a cache tag entry.

It is another object of the present invention to provide such read/write capability while also addressing the power-up cache flush problem.

According to the invention, roughly described, a chipset is provided which powers up in a default state with cacheing disabled and which writes permanently non-cacheable tags into tag RAM entries corresponding to memory addresses being read while cacheing is disabled. Even though no "valid" bit is cleared, erroneous cache hits after cacheing is enabled are automatically prevented since any address which does match a tag in the tag RAM, is a non-cacheable address and will force retrieval directly from main memory anyway. The concept of writing permanently non-cacheable tags into tag RAM instead of clearing valid bits can be extended beyond the power-up cache-flush problem to normal operation, to thereby eliminate the need for any valid bit at all in tag RAMs implemented using standard SRAM. It can also be used in set associative, fully associative, and k-way set associative cache memories.

In another aspect of the invention, again roughly described, cache control circuitry is provided which can select from two or more sources for the data to be written to tag RAM. One such source is, conventionally, a portion of the CPU bus address bits. Another source may be a register in the chipset which may be written to and read from by the CPU. In this way, any desired data may be written to an entry in the tag RAM by writing the information to the chipset register and then selecting the cache control mode which writes the information from the register into the tag RAM on the next main memory read access. The low-order address bits for the read access address the tag RAM as they do for conventional cache operation. Further, in this aspect of the invention, an additional cache control mode may be provided in which the information read from a tag entry addressed in a read access is written to the chipset register and made available for reading by the CPU. Yet an additional mode also may be made available in the cache controller in which the address of a noncacheable secondary memory block is selected for writing to the cache tag RAM at the address specified on the CPU address lines during a read access to main memory, thereby effectively invalidating the corresponding cache data line entry.

BRIEF DESCRIPTION OF THE DRAWINGS

The invention will be described with respect to particular embodiments thereof and reference will be made to the drawings, in which:

FIGS. 2-7, 7a, 7b, 8, 9, 9a, 10a, 10b, 10c and 10d illustrate register field definitions in the system controller of FIG. 1;

DETAILED DESCRIPTION

Figure 1:
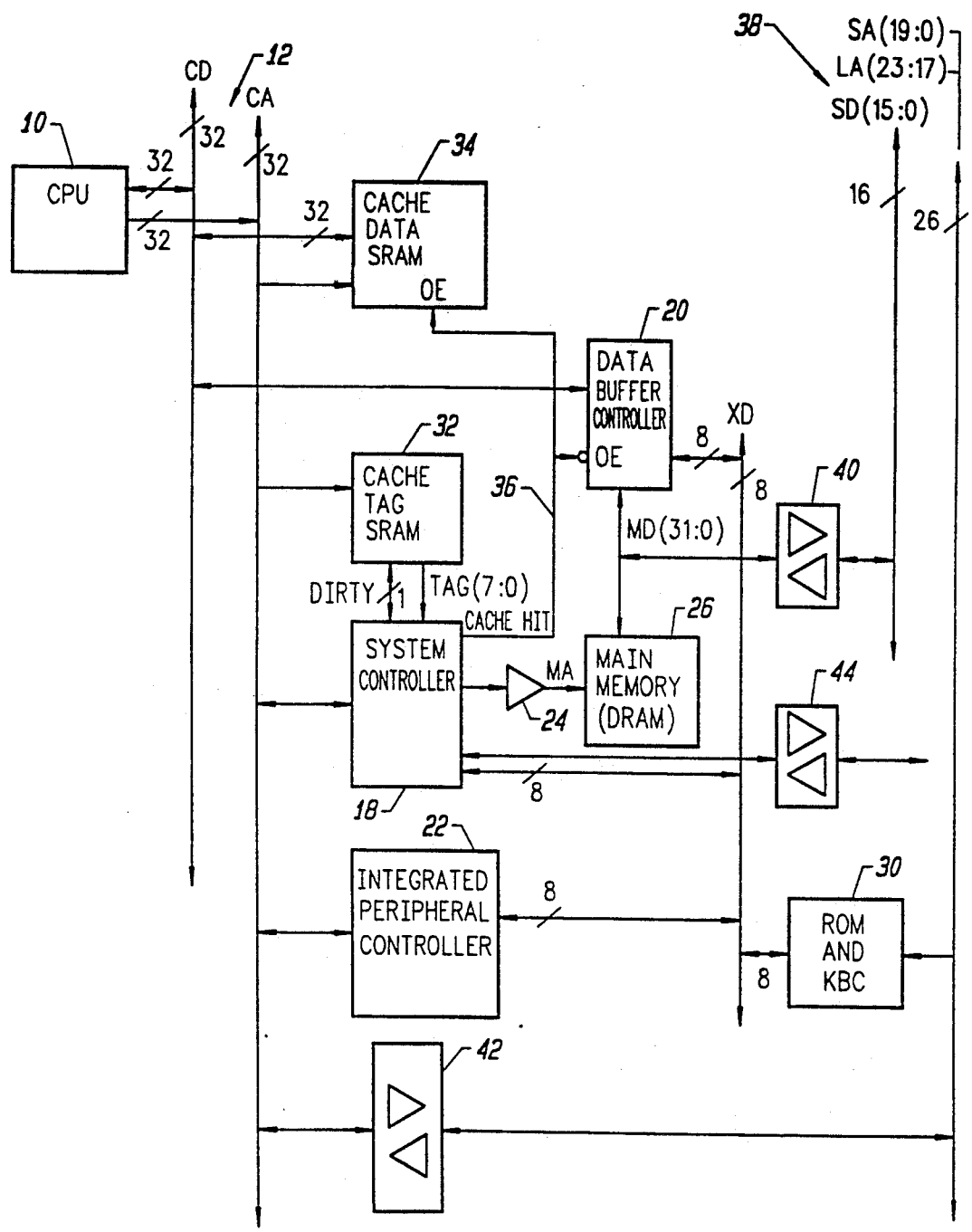
FIG. 1 is a block diagram of a PC AT-compatible computer architecture which may incorporate the invention.

FIG. 1 is a simplified block diagram of a PC AT Compatible Computer System which may incorporate the present invention. It comprises a CPU 10, which is preferably an 80386DX Microprocessor manufactured by Intel Corporation, Sunnyvale, Calif., coupled to a CPU bus 12. The CPU bus 12 (also called a local bus) comprises, among other things, a 32-bit CPU data bus CD and a 32-bit CPU address bus CA. A system controller (SYSC) chip 18 is coupled to the address lines of the CPU bus 12, and a data buffer controller (DBC) 20 is coupled to the data lines of CPU bus 12. The system controller may be an 82C391, and the data buffer controller may be an 82C392, both manufactured by OPTi, Inc., Santa Clara, Calif. Roughly, the system controller chip 18 performs duties related to the reset logic, system clock generation, the cache interface and cache control sub-system, local DRAM control sub-system, shadow RAM, AT bus state machine, bus arbitration logic, refresh logic, control of system BIOS ROM and I/O ports, a turbo switch and multiplexed DRAM addressing. The data buffer controller generally performs duties related to data bus conversion, parity generation and detection, clock generation and reset control, and any interface to a numeric co-processor (not shown). Also connected to the address lines of CPU bus 12 is an integrated peripheral controller (IPC) 22, which may be an 82C206 available from OPTi, Inc. The integrated peripheral controller includes a DMA controller, and interrupt controller, a timer peripheral and a real time clock (RTC).

The system controller 18 provides a memory address output which is coupled through a set of buffers 24 and a memory address bus MA to a main memory array of DRAM 26. Up to 64 megabytes of 32-bit wide DRAM can be accommodated in this array 26. The main memory DRAM 26 is also connected over a 32-bit memory data bus MD to the data buffer controller 20. The system controller 18 is also connected bi-directionally to an 8-bit ROM and keyboard data bus XD which is also connected bi-directionally to the data buffer controller 20, the integrated peripheral controller 22, and a ROM and keyboard controller unit 30. The ROM and keyboard controller (KBC) unit 30 includes the ROM BIOS at addresses F0000h-FFFFFh, possibly a socket for additional ROM at addresses E0000h-EFFFFh, and a keyboard controller chip such as an 8042 microcontroller manufactured by Intel Corp., and available pre-programmed for keyboard functions from Phoenix Technologies, Norwood, Mass.

The system controller 18 also communicates bi-directionally with Cache Tag SRAM 32 over an 8-bit TAG bus and a DIRTY line. The Cache Tag SRAM 32 and the Cache Data SRAM 34 are addressed by lines CA of the CPU bus 12, and the data SRAM 34 communicates bi-directionally with the CD data lines of the CPU bus 12. As will be seen, the system controller 18 includes Cache Tag Match Logic, and generates a Cache Hit signal which is communicated over a line 36 to an inverting output enable of data buffer controller 20, and to a non-inverting output enable of Cache Data SRAM 34.

The system also includes a so-called AT bus 38, which includes, among other things, a 16-bit data bus SD and an address bus including lines SA(19:0) and LA(23:17). The SA and LA lines both perform address functions, but the LA lines are valid earlier in an AT bus cycle and must be latched if needed later in the cycle. The SA lines are not valid as early as the LA lines, but remain valid longer. The SD lines are coupled to the memory data bus MD via a bi-directional buffer 40. Certain of the address lines on the AT bus 38 are coupled bi-directionally to the CPU bus 12 address lines CA via a bi-directional buffer 42, and certain control lines on the AT bus 38 are coupled to the system controller 18 via a set of buffers 44.

In general operation, on power up, a register bit in the system controller 18 comes up in a default state to indicate that cacheing is disabled. The first instruction fetch issued by the CPU 10 is to the address FFFFFFF0h, which is recognized by the system controller 18. The system controller 18 responds by causing a jump to the first instruction in the POST. The CPU fetches instructions continuing at that address. Since the POST is contained physically within the ROM in ROM/KBC unit 30, the system controller recognizes this and activates the buffers 42 to couple the address on the CPU address lines CA to the AT bus address lines, and then enables the ROM output onto the XD bus. The data buffer controller 20 receives the data from the ROM over the XD bus, assembles the 32-bit words expected by the CPU 10, and delivers them to the CPU 10 over the CD lines of CPU bus 12. Since cacheing is disabled, the system controller 18 will maintain the Cache Hit signal on line 36 low which enables the data buffer controller 20 output to the CD lines and disables the Cache Data SRAM 34 output to the CD lines.

As mentioned above, the POST performs many testing and initialization functions including, among other things, a test of all the main memory present in the system. This involves writing known information to each address in main memory, reading it back and comparing it to the information which was previously written. The POST also loads in an operating system from disk into main memory 26 and calls the user setup program.

The local bus 12 will now be described in more detail. It includes a plurality of address lines and a plurality of data lines, as well as a number of control lines and power and ground. The exact set of lines which make up the local bus is well known in the industry, and may be determined from various sources, including those identified above. For present purposes, it is sufficient to identify the local bus signal lines set forth in Table I. ("#" indicates active low.)

TABLE I

| | |
|---|---|
| CA(31:2) | Address lines. 32 bits of address are |

TABLE I-continued

| | |
|---|---|
| | available. The high-order 30 bits are provided on CA(31:2). |
| BE#(3:0) | Carries a 1-of-4 decode of the 2 low-order address bits. |
| CD(31:0) | Data lines. |
| M/IO# | Memory/ IO control line. When asserted high by the CPU, indicates that the address on CA is an I/O address as opposed to a main memory address. |
| READY# | Acknowledgement to CPU that a local memory access is complete. |
| CLK2 | Bus clock signal. |
| W/R# | Distinguishes write cycles from read cycles. |
| D/C# | Distinguishes data cycles, either memory or I/O, from control cycles which are: interrupt acknowledge, halt, and instruction fetching. |
| LOCK# | Indicates that other system bus masters are denied access to the system bus while it is active. |
| ADS# | Indicates that a valid bus cycle definition and address (W/R#,D/C#,M/IO#,BE0#,BE1#, BE2#,BE3# (or BHE# and BLE#) and CA) are being driven on the local bus. |
| NA# | Requests address pipelining. |
| BS16# | Allows direct connection of 32-bit and 16-bit data buses. |
| HOLD | Allows another bus master to request control of the local bus. |
| HLDA | Indicates that the CPU has surrendered control of its local bus to another bus master. |
| BUSY# | Signals a busy condition from a processor extension. |
| ERROR# | Signals an error condition from a processor extension. |
| PEREQ | Indicates that the processor extension has data to be transferred by the CPU. |
| INTR | A maskable input to CPU that signals the CPU to suspend execution of the current program and execute an interrupt acknowledge function. |
| NMI | A non-maskable input that signals the CPU to suspend execution of the current program and execute an interrupt acknowledge function. |
| RESET | Suspends any operation in progress and places the CPU in a known reset state. |

The various signals on the I/O bus are also well specified and well known in the industry. The Solari book identified above describes the lines in detail. For present purposes, only the signals set forth in Table II are important.

TABLE II

| | |
|---|---|
| SA(19:0) | 20 address lines. Sufficient to address 1MB of memory. Only SA(15:0) are used to address the 64k I/O address space, and only SA(9:0) are used to address the basic 1k AT I/O address space. |
| LA(23:17) | Additional address lines for addressing a 16MB memory address space on the I/O bus. The LA lines are valid earlier in an I/O bus cycle, but must be latched if needed later in the cycle. The SA lines are not valid as early as the LA lines, but remain valid longer. |
| BALE | Bus address latch enable line. In a CPU initiated I/O bus cycle, this line indicates when the address, AEN and SBHE# lines are valid. In other I/O bus cycles, the platform circuitry drives BALE high for the entire cycle. |
| SBHE# | System byte high enable. Indicates that current access or transfer is a 16-bit access or transfer (for which valid data will appear on SD(15:8) as well as SD(7:0)) rather than an 8-bit access or transfer. |
| AEN | When active, informs I/O resources on I/O bus to ignore the address and I/O command signals. Used primarily in DMA cycles where only the I/O resource which has requested and received a DMA acknowledgement signal (DACK#) knows to ignore AEN and respond to the I/O signal lines. Some systems include slot-specific $AEN_x$ signal lines. |
| SD(15:0) | 16 data lines. |
| MEMR#, SMEMR# | Read request lines to a memory resource on the I/O bus. SMEMR# is the same as MEMR# except that SMEMR# becomes active only when the read address is below 1MB (i.e., LA(23:20) = 0). |
| MEMW# SMEMW# | Write request lines to a memory resource on the I/O bus. SMEMW# becomes active only when the write address is below 1 MB. |
| IOR# | Read request lines to an I/O resource on the I/O bus. |
| IOW# | Write request lines to an I/O resource on the I/O bus. |
| MEMCS16# | Memory chip select 16. Asserted by an addressed memory resource on the I/O bus if the resource can support a 16-bit access cycle. |
| IOCS16# | I/O chip select 16. Asserted by an addressed I/O resource on the I/O bus if the resource can support a 16-bit access cycle. |
| SRDY# | Synchronous Ready line. Also sometimes called OWS# or ENDXFR#. Activated by an addressed I/O resource to indicate that it can support a shorter-than-normal access cycle. |
| IOCHRDY# | I/O channel ready line. Activated by an addressed I/O resource to indicate that the I/O access cycle is either a default-length cycle or a 0 wait state cycle. if the resource de-activates this line, the cycle will not end until it is re-activated. A de-activated IOCHRDY# supersedes an activated SRDY#. |
| MASTER# | After requesting and receiving a DMA-acknowledged (DACK#) signal, an I/O bus add-on card can assert MASTER# to become the bus master. |
| REFRESH# | Activated by refresh controller to indicate a refresh cycle. |
| IRQ(15, 14, 12:9, 7:3) | Interrupt request lines to interrupt controller for CPU. |
| DRQ(7:5, 3:0) | DMA Request lines from I/O resource on I/O bus to platform DMA controller. |
| DACK(7:5, 3:0) | DMA Acknowledge lines. |
| TC | DMA terminal count signal. Indicates that all data has been transferred. |
| BCLK | I/O bus clock signal. 6–8.33MHz square wave. |
| OCS | 14.318MHz square wave. |

The system controller 18, data buffer controller 20 and integrated peripheral controller 22 make up the OPTI-386WB PC/AT chipset. The system controller 18 and data buffer controller 20 are described in detail in OPTI, "OPTI-386WB PC/AT Chipset (82C391/82C392/82C206) Preliminary 82C391/82C392 Data Book" (Mar. 28, 1991). The data book and each of the chips are incorporated herein by reference.

In pertinent part, the system controller 18 has the input/output pins set forth in Table III.

TABLE III

CLOCK AND RESET

| Name | Direction | Description |
|---|---|---|
| CLK2I | Input | Clock input for internal state machine. |
| BCLK | Output | BCLK to AT bus. |
| BCLKS | Input | BCLK Selection (OSCIN/6 or OSCIN/8) |
| RST1# | Input | Cold reset signal, deriving either from Powergood |

TABLE III-continued

| Name | Direction | Description |
|---|---|---|
| | | signal of power supply or from Reset Switch. |
| RST2# | Input | CPU Reset input from Keyboard Controller or from DBC ERST2# pin. |
| CPURST | Output | Reset for 386 processor. |
| OSCIN | Input | Clock input with frequency of twice the rated CPU clock frequency. Used to generate CPURST. |

CPU INTERFACE

| Name | Direction | Description |
|---|---|---|
| CA(31:17, 7:2) | Input | CPU Address Lines. |
| CA(16:8) | Both | CPU Address Lines 16-8. These are input pins during CPU cycle. CA(16:9) are output pins for DMA address A16-A9 by latching XD(7:0) during 16-bit DMA cycle and CA(15:8) are DMA address A15-A8 for 8-bit DMA cycle. |
| BE(3:0) | Both | Byte Enable 3-0. In CPU cycle, driven by CPU. In master and DMA cycle, they are outputs deriving from XA0, XA1 and SBHE# from AT bus. |
| ADS# | Input | Status input from CPU. This active low signal indicates the CPU is starting a new cycle. |
| WR# | Input | CPU Write or Read Cycle Status. It indicates a write cycle if high and read cycle if low. |
| DC# | Input | CPU Data or Code Cycle Status. It indicates data transfer operations when high, or control operations (code fetch, halt, etc.) when low. |
| MIO# | Input | CPU Memory or I/O Cycle Status. If MIO# is high, then the address on the address lines refers to a memory address. If MIO# is low, then the address on the address lines is an I/O address. |
| RDY# | Output | Ready output for CPU to terminate the current cycle. This pin is not a tri-state output. |
| TURBO | Input | Turbo mode selection. |
| LDEV# | Input | Local Device indication. Permits external circuitry (such as a coprocessor) to trap an access to a device on the I/O bus and inhibit the I/O bus cycle. |

NUMERIC CO-PROCESSOR INTERFACE

| Name | Direction | Description |
|---|---|---|
| NPERR# | Input | Numeric Processor Error indication. |
| NPRST | Output | Numerical Processor Reset. CPURST or I/O write to port F1h will assert NPRST. It is asserted for 40 clk2 cycles and 80387 cannot be accessed within 50 clk2 cycles after NPRST is negated. |
| RDYI# | Input | Local Device Ready Input, it will be synchronized by SYSC before sending to CPU. For 387 READYO# signal. |
| BSYTOG# | Output | Toggled BUSY# when no numeric coprocessor installed. |

EXTERNAL CACHE CONTROL

| Name | Direction | Description |
|---|---|---|
| TAG(7:0) | Input | TAG RAM Lines 7-0. These lines are inputs from tag SRAM for TAG compare. |
| DRTY | Both | Dirty Bit of Tag RAM to indicate its line of cache memory has been written into. |
| TAGWE# | Output | TAG RAM Write Enable. It is used to update the tag RAM. |
| CAEOE# | Output | External Cache Even Bank Output Enable. It is always activated for 32k and 128k cache memory. CAEOE# is also asserted when CA15 and CA17 are low for 64KB and 256KB cache memory, respectively. |
| CAOOE# | Output | External Cache Odd Bank Output Enable. It is deactivated for 32 KB and 128 KB cache. CAOOE# is only asserted when CA15 and CA17 are high for 64KB and 256KB cache memory respectively. |
| CAEWE# | Output | External Cache Even Bank Write Enable. It is alway activated for 32k and 128k cache size and only asserted when CA15 is low for 64KB and CA17 is low for 256KB cache respectively. |
| CAOWE# | Output | External Cache Odd Bank Write Enable. It is only asserted when CA15 and CA17 is high for 64KB and 256Kb cache respectively. |
| DRTYW# | Output | Write strobe to Dirty Bit of Tag Ram. |
| A2CON | Output | Cache Address Bit 2 Toggle Control. It is toggled during cache read miss cycle. |
| A3CON | Output | Cache Address Bit 3 Toggle Control. It is toggled during cache read miss cycle. |

LOCAL DRAM INTERFACE

| Name | Direction | Description |
|---|---|---|
| DWE# | Output | DRAM Write Enable signal. |
| RAS(3:0)# | Output | DRAM Row Address Strobes. |

TABLE III-continued

| | | |
|---|---|---|
| CAS(15:0)# | Output | DRAM Column Address Strobes. |
| MA(10:0) | Output | DRAM Row/Column Address lines 10:0. |

INTERFACE TO DATA BUS CONTROLLER CHIP

| Name | Direction | Description |
|---|---|---|
| LMEN# | Output | Local Memory Accessed Indication. Used by DBC to control the bus flow. |
| DLE | Output | Dram Read Data Latch Enable; used for parity checking. |
| MIO16# | Output | Latched AT-bus 16-bit Slave Status; used for bus conversion. |
| PCKEN# | Output | Parity checking Enable; used by Data Bus Controller to perform parity checking. |
| ATCYC# | Output | AT Cycle Indication for CPU cycle. |

BUS ARBITRATION SIGNALS

| | | |
|---|---|---|
| HRQ | Input | DMA or Master Cycle Request from IPC. |
| HLDA1 | Output | DMA or Master Cycle Granted Notice. |
| OUT1 | Input | Refresh Request from Timer1 Output. |
| HLDA | Input | CPU Hold Acknowledge. |
| ADS8 | Input | 8-bit DMA Transfer Address Strobe. The SYSC has to latch XD(7:0) by using ADS8 and translate to CA(15:8) outputs. |
| AEN8# | Input | 8-bit DMA Cycle Indication. |
| ADS16 | Input | 16-bit DMA Transfer Address Strobe. The SYSC has to latch XD(7:0) by using ADS16 and translate to CA(16:9) outputs. |
| AEN16# | Input | 16-bit DMA Transfer Indication. |
| HOLD | Output | Hold request to CPU. Hidden refresh will not hold the CPU. |
| RFSH# | Both | AT Refresh Cycle Indication. Is it an input pin during master or DMA cycle. |

I/O BUS INTERFACE

| Name | Direction | Description |
|---|---|---|
| CA0 | Both | System Address Line 0, it is an input pin during master or 8-bit DMA cycle; becomes output pin during CPU, 16-bit DMA cycle or refresh cycle. |
| CA1 | Both | System Address Line 1, it is an input pin during master or DMA cycle; becomes output pin during CPU or refresh cycle. |
| GATEA20 | Input | GateA20 input from 8042 or DBC emulated gate A20 pin. |
| GA20 | Both | Gated AT bus A20; connected to AT bus LA20 indirectly through a buffer. It's an input pin during master cycle. |
| XD(7:0) | Both | Peripheral Data Bus Line 7-0. Two purposes for these pins: program the internal index register, latch the DMA high-order address. |
| CHRDY | Input | Channel Ready Input from AT-Bus. It is a schmitt trigger input pin. |
| NOWS# | Input | Zero Wait State Input from AT-BUS. It is a schmitt trigger input pin. System BIOS ROM is treated as AT zero wait state cycle. |
| IO16# | Input | 16-bit IO Slave Cycle Status. It is a schmitt trigger input pin. |
| M16# | Input | 16-bit Memory Slave Cycle Status. It is a schmitt trigger input pin. |
| IORD# | Both | AT IO Read Command. It is output in CPU cycle. It is input DMA or master cycle. |
| IOWR# | Both | AT IO Write Command. It is output in CPU cycle. It is input in DMA or master cycle. |
| MRD# | Both | AT Memory Read Command. It is output in CPU cycle. It is input in DMA or master cycle. |
| MWR# | Both | AT Memory Write Command. It is output in CPU cycle. It is input in DMA or master cycle. |
| SMRD# | Output | AT Memory Read Command, for address below 1MB. It is active during refresh cycle. |
| SMWR# | Output | AT Memory Write Command, for address below 1 MB memory space. |
| ALE | Output | AT Bus Address Latch Enable to represent that the AT cycle has started. It is Hi-Z during non-CPU cycle. |
| SBHE# | Both | Byte High Enable. In CPU cycle, it is output according to BE(3:0). In master cycle, it is input. |
| INTA# | Output | Interrupt Acknowledge Cycle Indication. Hold will not send to CPU between the INTA* cycles. |
| ROMCS# | Output | System BIOS ROM Output Enable. System BIOS ROM accessing could be either 8-bit or 16-bit. The |

TABLE III-continued

| | | system controller 18 supports both 8-bit and 16-bit reads from BIOS ROM. If 8-bit ROM is selected, the system BIOS ROM will reside physically on the XT bus as shown in FIG. 1. If 16-bit ROM cycles are required, the BIOS ROM must be located physically on the SD bus. In this case the ROMCS# output of system controller 18 should be connected to the M16# input of system controller 18 via an open collector buffer to indicate to the system controller 18 that the current system BIOS is to be read via a 16-bit I/O cycle. |
|---|---|---|
| GROUND AND VCC | | |
| Name | Direction | Description |
| VCC | Input | +5V |
| GND | Input | VSS or Ground. |

The pin signals for data buffer controller 20 are described in Table IV.

TABLE IV

| CLOCK AND RESET | | |
|---|---|---|
| Name | Direction | Description |
| OSCX1 | Input | 14.3 Mhz osc. input. |
| OSCX2 | Output | 14.3 Mhz osc. output. |
| OSC | Output | 14.3 Mhz osc. output to AT bus. |
| OSC12 | Output | 1.19 Mhz output to IPC22. |
| OSC2 | Output | 14.3 Mhz/2 output for 8042 clock. |
| OSC2# | Output | Complement of OSC2. |
| PWRGD | Input schmt | Power Good Status from power supply. |
| RSTSW | Input schmt | Reset Switch Input. |
| RST1# | Output | Power-up or cold Reset signal derived from PWGD# or RSTSW. |
| ADDRESS AND DATA BUSES | | |
| Name | Direction | Description |
| D(31:0) | Both | CPU Data Bus. |
| MP(3:0) | Both | Local DRAM bus parity bits. |
| A(9:0) | Input | Buffered AT SA(9:0) lines. |
| SBHE | Input | Byte High Enable from AT bus and SYSC. |
| BE(3:0)# | Input | CPU Byte Enables; used in DBC for data bus parity checking of valid byte. |
| MD(31:0) | Both | Local DRAM Data Bus. |
| XD(7:0) | Both | XD bus lines. |
| BUS ARBITRATION | | |
| HLDA | Input | Hold Acknowledge from CPU in response to hold request. |
| AEN8# | Input | 8-bit DMA Cycle Indication. |
| AEN16# | Input | 16-bit DMA Cycle Indication. |
| AEN# | Output | DMA Cycle Indication. |
| Master# | Input | Master Cycle Indication. |
| RFSH# | Input | Refresh Cycle Indication. |
| INTERFACE TO SYSTEM CONTROLLER 18 | | |
| Name | Direction | Description |
| INTA# | Input | Interrupt Acknowledge, used to direct the data flow. |
| ROMCS# | Input | System BIOS ROM Chip Select. Used to direct the data bus flow. |
| LMEN# | Input | Local Memory Enable. Indicates the current cycle is a local DRAM access. used to control bus direction. |
| WR# | Input | CPU write or read indication. |
| DLE | Input | DRAM Read Data Latch, used to latch the data for parity checking. |
| ATCYC# | Input | AT Cycle Indication. If asserted, the current access is AT bus cycle. |
| PCKEN# | Input | Parity Checkding Enable, to enable the Parity error signal, if any. |
| MIO16# | Input | 16-bit slave devices access indication. It is used to control the data flow path. |
| IOWR# | Input | AT bus I/O write command. |
| IORD# | Input | AT bus I/O read command. |
| MEMRD# | Input | AT bus Memory Read Command. |
| MEMWR# | Input | AT bus Memory Write Command. |
| DWE# | Input | DRAM Write Enable, used to enable the write to DRAM. |
| NUMERIC PROCESSOR INTERFACES | | |
| Name | Direction | Description |
| NPERR# | Input | Numeric Processor Error from 80387. it is an active low input indicating that an unmasked error |

TABLE IV-continued

| Name | Direction | Description |
|---|---|---|
| | | happens. |
| NPBUSY# | Input | Numeric Processor Busy from 80387 to indicate a coprocessor instruction is under execution. |
| NPRST | Input | Reset Numeric Processor. |
| BUSY# | Output | Latched Coprocessor Busy Output to 80386 to indicate a NPBUSY# or NPERR# signals has occurred. |
| BSYTOG# | Input | Busy Toggled Control; used to toggle the BUSY# signal when 80387 coprocessor is not installed. |
| INT13 | Output | Numeric Processor Interrupt. It is an interrupt request from numeric coprocessor and connected to IRQ13 of interrupt controller. |
| ERR# | Output | Error signal to 80386. It reflects the NPERR# signal during the period from RST4# active to first ROMCS#. |
| WINT | Input | Weitek 3167 Co-processor Interrupt Request. |
| PREQI | Input | 80387 coprocessor Request Input. |
| PREQO | Output | Numeric Processor Request to 80386. |
| MISCELLANEOUS SIGNALS | | |
| Name | Direction | Description |
| KBDCS# | Output | Keyboard Controller Chip Select. |
| NMI | Output | Non-maskable interrupt; due to parity error from local memory or AT bus channel check. |
| SPKD | Output | Speaker Data Output, derived from the function of OUT2 and port 61H bit1. |
| CHCK# | Input | AT-BUS Channel Check. |
| EGTA20 | Output | GateA20 output. It is generated by emulating Keyboard GATEA20. |
| ERST2# | Output | RST2# output. It is generated by emulating keyboard RST2#. |
| SDEN# | Output | MD to SD buffer enable signal. |
| SDIR1# | Output | MD(7:0) to SD(7:0) Buffer Direction Control. |
| SDIR2# | Output | MD(15:8) to SD(15:8) Buffer Direction Control. |
| GATE2 | Output | Timer 2 Gate Control. |
| ASRTC | Output | Real Time Clock Address Strobe. |
| OUT2 | Output | Timer 2 Output. |
| FAST | Input | FAST is an active high input which will enable the emulation of Fast GATEA20 and Reset Control Enable. |
| M16# | Output | Master Access Local DRAM invalidation. |
| GROUND AND VCC | | |
| Name | Direction | Description |
| VCC | | +5V. |
| GND | | VSS or Ground. |

The integrated peripheral controller is essentially an industry standard product and is described in United Microelectronics Corp., "UM82C206 Integrated Peripheral Controller", preliminary data sheet, (February, 1991), incorporated herein by reference.

The chips 20 and 22 operate in response to a plurality of command and configuration "index" registers which may be written to or read from by the CPU. In order to access an index register, the CPU must first write the index number to an I/O Port such as 22h, then read or write data to or from another I/O Port such as 24h. Most of the registers are located in the system controller chip 18, but a few are located in the data buffer controller 20. The registers are described below only as required for an understanding of the invention.

Control register 1 controls various miscellaneous functions of the system controller chip 18. It is accessible at index location 20h, and its field definition is set forth in FIG. 2.

Control register 2, accessible at index location 21h, contains several miscellaneous control bits as well as certain cache related control bits. In particular, as evidenced in FIG. 3, a system according to FIG. 1 can be configured with a 32 k-byte cache, 64 k-byte cache, a 128 k-byte cache or a 256 k-byte cache. The setup program writes bits 3:2 of index register 21h to configure the system controller 18 with the cache size. The setup program also writes bits 1:0 to indicate the size of each SRAM chip and the number of wait states to insert on cache write. Index 21h also contains the cache enable bit at bit 4. This bit powers up in the state which disables cacheing and, as will be seen, controls tag flushing.

FIGS. 4, 5 and 6 describe shadow RAM control registers I, II, III, respectively, accessible at index locations 22h, 23h and 26h, respectively. Roughly, shadow RAM can be enabled (such that all reads and writes occur to DRAM rather than corresponding ROM locations) in 32 k-byte blocks from addresses C0000h--EFFFFh. The entire C block can also be disabled as a unit, as can the entire D block or the entire E block. The entire C block can also be write protected as a unit, as can the entire D block and the entire E block. To permit copying from ROMS on the AT bus into shadow RAM for the C, D and E blocks, activating bit 6 of index location 26h will cause all reads from these addresses to occur from the AT bus and all writes to go to DRAM. The F block has only one bit to control its shadow RAM, bit 7 of index location 22h if activated, all reads are from ROM and all writes are to DRAM to permit copying. If deactivated, after copying, all reads are from DRAM and no writes are permitted.

DRAM control register I, accessible at index location 24h, permits the user to program the bank organization of the DRAMS used in main memory 26. The field definition is shown in FIGS. 7, 7a and 7b.

DRAM control register II, accessible at index location 25h, allows the system to be programmed for 0, 1 or 2 additional wait states on reading from main memory 26, and 0, 1, 2 or 3 additional wait states on writing to main memory 26. The field definition for index location 25h is shown in FIG. 8.

Control of the cacheing function is achieved through index locations 27h-2Bh. Control register III, accessible at index location 27h, contains a bit 7 a bit which enables or disables all cacheing. On power up, this bit is in the default state of 1, disabling all cacheing. Index 21h bit 4 will override the state of this bit to disable cacheing.

FIG. 9 describes the field of definition for index location 27h. As can be seen, when cacheing is enabled, bits 3:0 of index 27h indicate the maximum cacheable address range. The code for bits 3:0 of index 27h is set forth in FIG. 9A. If the cache is 32 k bytes, the maximum cacheable address range is 8 megabytes. If the cache is 62 k bytes, the maximum cacheable address range is 16 megabytes. If the cache is 128 k bytes, then the maximum cacheable address range is 32 megabytes, and if the cache is 256 k bytes, the maximum cacheable address range is 64 megabytes.

Addresses A0000h-BFFFFh and C8000h-FFFFFh are permanently non-cacheable, and the cacheability of addresses C0000h-C7FFFh is controlled by index 27h bit 4. System controller 18 also permits user specification of two non-cacheable memory blocks. The first of these is programmed using index locations 28h and 29h, and the second is programmed using index locations 2Ah and 2Bh. The starting address for a non-cacheable block must have the same granularity as the block size. For example, if a 512 k byte non-cacheable block is selected, its starting address must be a multiple of 512 k bytes. Consequently, only address bits 23:19 are significant to identify the block. FIGS. 10A-10D set out the field definitions for index locations 28h and 29h. As can be seen from FIGS. 10A and 10B, bits 7:5 of index 28h contain a code indicating the non-cacheable block size, and bits 1:0 of index 28h and 7:0 of index 29h contain bits 25:16 of the address of the non-cacheable block. FIG. 10C defines the block size code in index 28h bits 7:5, and FIG. 10D explains which of address bits 23:16 are valid for each selected block size. In these figures, V indicates a valid bit and x indicates a bit which is ignored. The second non-cacheable block, defined in index locations 2Ah and 2Bh, follows field definitions identical with those of index 29h. If a memory read or write occurs on the CPU bus 12 (FIG. 1) to an address which is within one of the non-cacheable memory blocks, whether or not cacheing is enabled, the system controller 18 causes the information to be read or written from or to main memory 26 rather than the cache. Neither the cache data SRAM 34 nor the cache tag SRAM 32 is updated.

The data buffer controller performs data bus conversion when the CPU accesses 16- or 8-bit devices through 32/16-bit instructions. The bus conversion is also supported for DMA and master cycles for transfers between main memory 26 or cache data SRAM 34, and devices which reside on the AT bus 38. During the process, the data buffer controller 20 provides all the signals necessary to control the external bi-directional data buffers.

DBC control register index 21h contains a write-only copy of control register index 21h of SYSC in bit 7:4. Bits 3:0 are not used. The data buffer controller 20 also includes four registers accessible directly at I/O port addresses 60h, 61h, 64h and 70h. These registers are not important to an understanding of the present invention.

Figure 11:
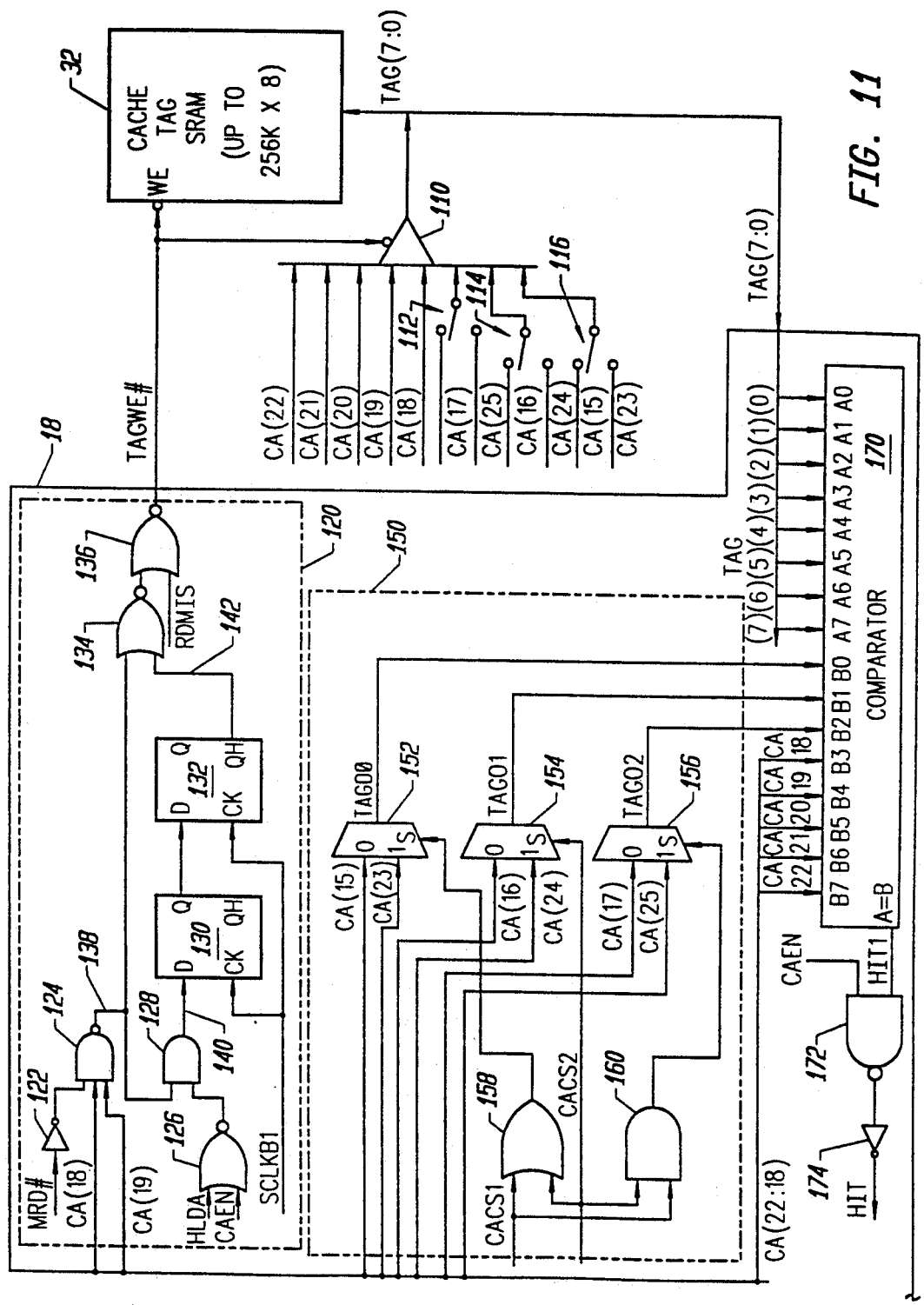
FIG. 11 is a block diagram of cache management related circuitry which may incorporate the invention.

FIG. 11 is a block diagram showing the cache tag SRAM 32 of FIG. 1 and relevant circuitry of the system controller 18. The cache tag SRAM 32 has an inverting write enable (WE) input which is connected to the TAGWE# output of system controller 18, and a bi-directional TAG bus which is connected as inputs to the TAG(7:0) pins on the system controller 18. An octal buffer 110 is also provided with its 8 inputs connected respectively to CPU address lines CA(22), CA(21), CA(20), CA(19), CA(18), the common of a jumper 112, the common of a jumper 114 and the common of a jumper 116. Jumper 112 connects its common to selectably CA(17) or CA(25), and the jumper 114 connects its common to selectably to CA(25) or CA(16). The jumper 116 connects its common to selectably CA(15) or CA(23). The 8 outputs of the buffer 110 are connected to TAG(7:0), respectively, and the active low output enable of buffer 110 is connected to the TAGWE# output of system controller 18.

Inside system controller chip 18, TAGWE circuitry 120 generates the TAGWE# output signal from an MRD# signal, CPU address lines CA(19:18), HLDA, a CAEN signal, an RDMIS signal and a clock signal SCLKB1. MRD# is generated from external signals by means not shown and indicates that a non-cacheable AT bus memory read cycle is underway. HLDA is generated by the CPU 10 and indicates that another device has control over the CPU bus 12. The CAEN signal derives from index register 21h bit 4 ("cache enable"). RDMIS is generated from other sources not shown and not important to the invention, and generally indicates that a read miss has occurred during normal operation while cacheing is enabled. SCLKB1 is a half-frequency version of the CPU clock.

The MRD# signal is connected to the input of an invertor 122, the output of which is connected to one input of a 3-input NAND gate 124. The other two inputs of NAND gate 124 are connected to CA(19:18). The HLDA signal and the CAEN signal are each connected to a respective input of a 2-input NOR gate 126. The output of NOR gate 126 and the output of NAND gate 124 are each connected to respective inputs of a 2-input AND gate 128, the output of which is connected to the D input of a D flip-flop 130. The Q output of flip-flop 130 is connected to the D input of another D flip-flop 132, the inverting (QN) output of which is connected to one input of a 2-input NOR gate 134. The other input of the 2-input NOR gate 134 is connected to the output of NAND gate 124. The clock inputs to both of the flip-flops 130 and 132 are connected to the SCLKB1 signal. The output of NOR gate 134 is connected to one input of another 2-input NOR gate 136, the other input of which is connected to receive the RDMIS signal. The output of NOR gate 136 forms the TAGWE# output of system controller chip 18.

The operation of TAGWE circuitry 120 is such as to generate a pulse on the TAGWE# output only when a memory read access is being performed by the CPU over the AT bus, from an address in the range C0000h-FFFFFh, while cacheing is disabled according to index register 21h bit 4. The circuitry 120 will also activate the TAGWE# signal whenever the RDMIS signal becomes active, but this situation is not important to the invention and will not further be described. Assuming RDMIS is low (inactive), the circuitry 120 will activate TAGWE# (active low) only when the output of NOR gate 134 is high. This in turn will be the case only when both inputs of the NOR gate 134 are low.

Accordingly, a zero logic level on either input of NOR gate 134 will prevent TAGWE# from becoming active.

It can be seen that TAGWE# will never be active when MRD# is inactive (high) since that would force a 1 on the output of NAND gate 124 and accordingly on one of the inputs of NOR gate 134. Similarly, both bits CA(19:18) must be high for the output of NAND gate 124 to be low. NAND gate 124 thus ensures that TAGWE# will not be activated unless a memory read cycle is taking place over the AT bus from an address in the C, D, E or F block of main memory (where CA(19) and CA(18) are high). Note that the bits above CA(19) need not be checked since the only cacheable memory space in the system which resides on the AT bus is in the C-F blocks. Higher addresses all must reside on the local bus to be cacheable, and accesses to these addresses will not activate MRD#.

The other input of NOR gate 134 cannot go low unless the D input of flip-flop 130 was high two clock cycles earlier. This can only occur if the output of NOR gate 126 was high, which means both HLDA and CAEN must have been low. HLDA=0 means the address being provided on the CPU address bus is generated by the CPU, and CAEN=0 means cacheing is disabled. Accordingly, assuming RDMIS is low the TAGWE circuitry 120 will generate a low (active) signal on TAGWE# only on a memory read cycle over the AT bus, from an address in C, D, E or F block, generated by the CPU, while cacheing is disabled.

Figures 12, 13:
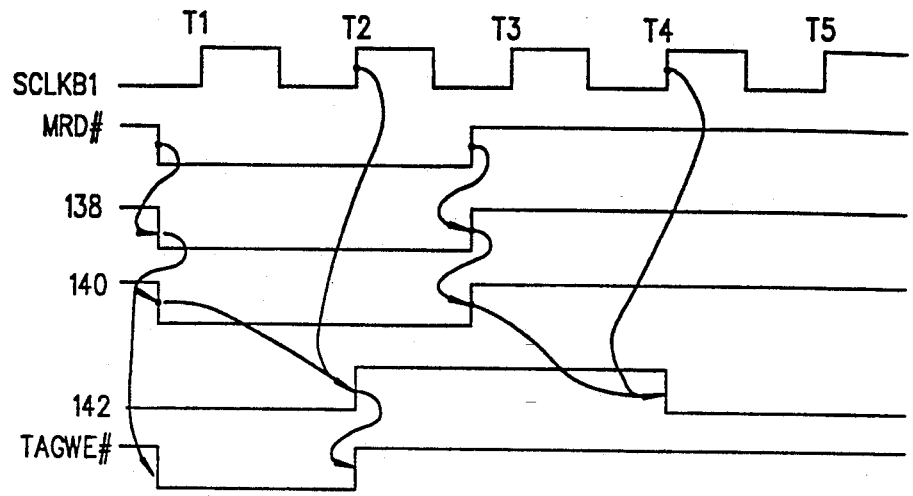
FIG. 12 is a timing diagram useful for understanding a portion of FIG. 11.
FIG. 13 is a table useful for explaining the operation of an aspect of FIG. 11.

FIG. 12 is a timing diagram showing how the circuitry 120 generates a pulse when the conditions are satisfied. The diagram assumes HLDA, CAEN and RDMIS are all 0, and CA(19:18) are both high. The diagram follows TAGWE# when MRD# goes low to indicate that a memory read over the AT bus is occurring.

At the start of FIG. 12, MRD# is high, thereby causing the signal at node 138 (the output of NAND gate 124) to be high, which in turn causes the signal at node 140 (the output of AND gate 128) to be high. 140 is assumed to have been high for some time, so the signal at node 142 (the inverting output of D flip-flop 132) is low. Since the signal at node 138 is high, TAGWE# is low at the start of FIG. 12.

At some time prior to a time T1, MRD# goes low. This causes node 138 to go low, which in turn immediately cause node 142 to go low. Since nodes 138 and 142 are both low at this point, the TAGWE# signal will also go low.

At time T1, SCLKB1 has a rising edge. This loads the low logic level on node 140 into D flip-flop 130, but does not otherwise affect the circuitry. At the next rising edge of SCLKB1 occurring at time T2, the low of node 140 first appears at node 142 as a logic 1. This immediately causes TAGWE# to return to its high level.

Some time later, for example, at a time between T2 and T3, MRD# returns to its high level, thereby bringing the signal on node 138 high and the signal on node 140 high. The signal on node 142 remains high until time T4, which is the next rising edge of SCLKB1, at which time the high logic level which was present at node 140 is transferred to node 142 as a low logic level. This change on node 142 does not affect TAGWE# at this time, however, since the signal at node 138 is already high and a change at node 142 cannot affect the output. Accordingly, it can be seen that TAGWE circuitry 120 generates a low-going pulse for at least a full SCLKB1 cycle in response to a memory read with the required conditions.

System controller chip 18 also includes tag bit multiplexing circuitry 150, which generates three tag bits TAG0, TAG1 and TAG2 for match comparator purposes. As mentioned above, the system controller 18 can be used with a 32 k, 64 k, 128 k or 256 k-byte cache as specified in index 21$h$ bits 3:2. Each size requires a different set of address bits for addressing the cache tag SRAM 32, and a different set of address bits to be stored as tag data in the cache tag SRAM 32. In order to maintain the 8-bit width of cache tag SRAM 32, three of its tag data bits are multiplexed.

FIG. 13 explains this in more detail. The four different cache sizes are shown on four separate lines in FIG. 13, with the index 21$h$(3:2) code corresponding to that cache size in the first and second columns. The fourth column states which bits of the CPU address bus CA are used to address the tag SRAM. Since each entry in the cache contains a line of 16 bytes of data, CA(3:0) are not needed to address an entry in the tag SRAM 32. Thus, for a 32 k-byte cache, only CA(14:4) are necessary to address the tag SRAM. Similarly, for a 64 k-byte cache, CA(15:4) are needed. CA(16:4) are needed to address a 128 k-byte cache, and CA(17:4) are needed to address a 256 k-byte cache.

The tag data stored in cache tag SRAM 32 is always the next eight address bits above the bits which are used to address the tag SRAM. Thus, for a 32 k-byte cache, CA(22:15) are stored as a tag. In a 64 k-byte cache, CA(23:16) is stored as the tag. In a 128 k-byte cache, CA(24:17) is stored as the tag, and in a 256 k-byte cache, CA(25:18) is stored as the tag. Since it does not matter in which order the various bits of a tag are stored in the tag RAM, the computer of FIG. 1 stores them in a manner which minimizes the circuitry required to alter which bits are stored. In particular, as shown in FIG. 13, TAG(7:3) always stores CA(22:18). TAG(2) stores CA(17) for the 32 k, 64 k and 128 k-byte caches, and stores CA(25) for the 256 k-byte cache. TAG(1) stores CA(16) for the 32 k and 64 k-byte caches, and stores CA(24) for the 128 k and 256 k-byte caches. Finally, TAG(0) stores CA(15) for a 32 k-byte cache, and stores CA(23) for each of the other three cache sizes. When tag data is being written into the cache tag SRAM 32, the jumpers 112, 114 and 116 select the appropriate CA bit to write into bits TAG(2:0). The user must set the jumpers properly for the cache size that has been selected. When tags are read from the cache tag SRAM 32, multiplexing circuitry 150 selects the appropriate CA bits for comparing to bits TAG(2:0) which are read from tag SRAM 32.

In particular, multiplexing circuitry 150 includes three multiplexers 152, 154 and 156. Multiplexer 152 has its '0' input connected to the CA(15) line and its '1' input connected to the CA(23) line. The multiplexer 154 has its '0' input connected to CA(16) and its '1' input connected to CA(24). The multiplexer 156 has its '0' input connected to CA(17) and its '1' input connected to CA(25). Index 21$h$(3:2) are provided as signals CACS2 and CACS1, respectively, to a pair of inputs to an OR gate 158, the output of which is connected to the select input of multiplexer 152. CACS1 and CACS2 are also connected to the two inputs of an AND gate 160, the output of which is connected to the select input of multiplexer 156. CACS2 is also connected directly to the select input of multiplexer 154. It can be seen that multiplexer 152 will output, on a line identified as TAG0, CA(15) only if both CACS1 and CACS2 are low, and will otherwise output CA(23). Multiplexer 154 will output, on a line identified as TAGO1, CA(16) as long as CACS2 is low and CA(24) as long as CACS2 is high. Multiplexer 156 will output, on a line identified as TAGO2, CA(25) only if both CACS1 and CACS2 are high, and CA(17) otherwise.

System controller 18 also includes a match comparator 170 having inputs A(7:0) and B(7:0). The inputs A(7:0) are connected to receive the TAG(7:0) bits from the cache tag SRAM 32. Inputs B(7:3) are connected to receive CA(22:18), and B2, B1 and B0 are connected to receive, respectively, TAGO2, TAGO1 and TAGO0 from the multiplexing circuitry 150.

When the two 8-bit inputs match, a logic 1 is generated on an HIT1 output of the comparator 170. The HIT1 signal is NANDed with the CAEN (cache enable) signal by NAND gate 172, the output of which is connected to an invertor 174, the output of which forms the HIT signal. It can be seen that the HIT signal, which is used by other circuitry (not shown), indicates that a cache hit has occurred while cacheing was enabled. The jumpers 112, 114 and 116 and the multiplexing circuitry 150 ensure that the correct address bits will be compared to the correct tag bits in the match comparator 170.

It can be seen that when a low going pulse occurs on TAGWE#, the appropriate address bits from the CPU address bus are enabled onto the TAG(7:0) bus by buffer 110, and written to the appropriate entry in tag SRAM 32. Assuming RDMIS remains low (which will be the case as long as cacheing is disabled), this will only occur on a memory read by the CPU 10, from C, D, E or F block, while cacheing is disabled. And since CA(18) and CA(19) must both be high for this to occur, and these are two of the bits which are written into the tag entry in tag SRAM 32, it is assured that only addresses in the E and F blocks will be written into tag SRAM 32. Since addresses within these two blocks are permanently non-cacheable, a read from corresponding addresses after cacheing has subsequently been enabled, will never result in invalid data being read erroneously from cache data SRAM 34.

In operation, the system powers up with index 21h bit 4 at a default 0 value, thereby disabling cacheing. This brings CAEN low (FIG. 11). As part of the normal memory testing procedures in the POST, the CPU 10 will read from at least one byte (and typically many more) of each 16-byte line in the C, D, E and F blocks. For each of these lines, the circuitry of FIG. 11 will write the C, D, E or F block tag into the cache tag SRAM entry corresponding to that line. Since the tag identifies a non-cacheable address, this procedure effectively invalidates each such line in the cache.

It can be seen that this procedure will work correctly for any cache size up to 128 k byte, since the E and F blocks are permanently non-cacheable and together cover 128 k bytes. That is, each line address in a 128 k cache has a corresponding line address in the E and F blocks. Since the POST reads at least one byte from each line address within the E and F blocks, it is assured that each line in the 128 k-byte cache will be invalidated by writing a corresponding E or F block tag into the tag SRAM 32.

However, for a 256 k-byte cache, the 32 k-byte range between C0000h and C8000h will receive tags corresponding to addresses between C0000h and C8000h. This range is optionally cacheable according to index 27h bit 4 as previously mentioned. Accordingly, if the POST or the user enables cacheing within this range shortly after initialization, then the data in cache data SRAM 34 corresponding to these entries in cache tag SRAM 32 will erroneously be interpreted as valid. To correct this problem, after cacheing has been enabled (both generally and in C0000h-C800h), the setup program should read 32 k bytes from lines corresponding to this address range, but from a different 256 k-byte block of memory. For example, it could read from addresses 00000h-08000h. Such a routine would generate a cache miss for each line within that 32 k-byte portion of the cache, thereby causing those lines to be filled and valid tag information written into the tag SRAM 32.

Figure 14:
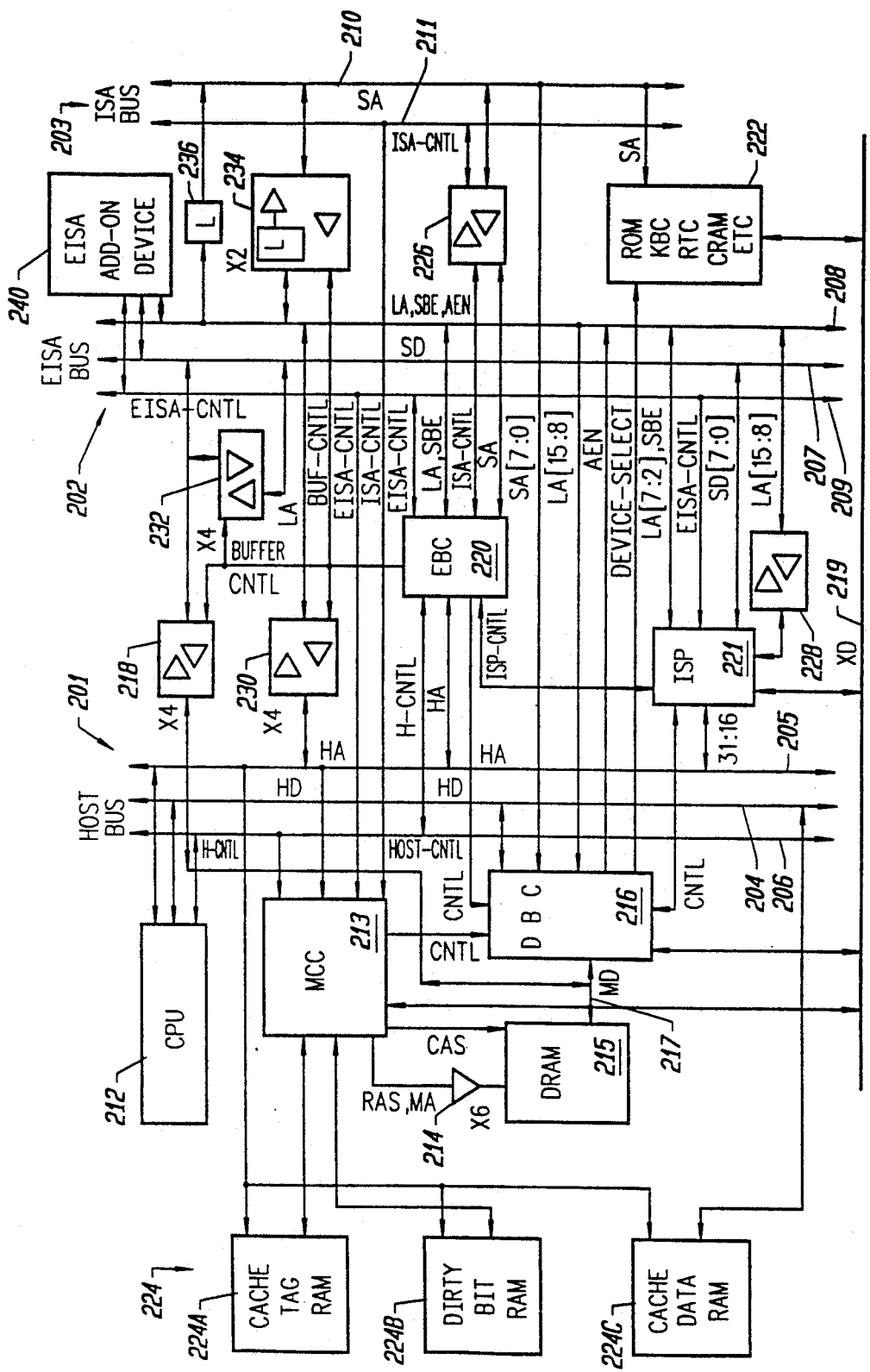
FIG. 14 is a block diagram of an EISA-compatible computer architecture which may incorporate the invention.

FIG. 14 is a simplified block diagram of important features of an EISA-based microcomputer system which also may incorporate the invention. It comprises a host or CPU bus 201, an EISA bus 202, and an ISA bus 203. The host bus 201 includes HD data lines 204, HA address lines 205, and a plurality of control lines 206. The EISA bus 202 includes SD data lines 207, LA, SBE and AEN address lines 208, as well as EISA control lines 209, and the ISA bus 203 includes SA address lines 210 and ISA control lines 211. The ISA bus 203 does not include any data lines since such lines would be duplicative of the SD lines 207 on EISA bus 202.

A CPU 212, such as an Intel 80486, as well as an optional numeric coprocessor (not shown), are coupled to the address, data and control lines of host bus 201. The address and control lines of host bus 201 are also connected to a memory/cache controller (MCC) 213, which is also connected to the EISA control lines 209 and to the ISA control lines 211. The MCC 213 provides memory address and RAS information via buffers 214 to a DRAM array (host memory) 215, as well as providing CAS information to DRAM 215. The data lines of DRAM 215 are coupled over an MD bus 217 to a data bus controller (DBC) 216, which is also coupled via bi-directional buffers 218 to the SD data lines 207 of EISA bus 202. MD bus 217 is also coupled to the SD lines 207 via bi-directional buffers 218. The DBC 216 is also connected to the HD data lines 204 of host bus 201 bi-directionally, and is connected to receive SA(7:0) from the address lines 210 of the ISA bus 203 and LA(15:8) from the address lines 208 of EISA bus 202. DBC 216 generates an AEN signal for EISA bus 202. Both the MCC 213 and the DBC 216 communicate bi-directionally with an 8-bit XD data bus 219. The DBC 216 receives control signals from the MCC 213, an EISA bus controller 220 (discussed below), and an integrated system peripheral 221 (discussed below). The DBC 216 also provides device select signals to a plurality 222 of 8-bit devices, the data lines of which are coupled to the XD bus 219. The plurality 222 can include a read-only memory (ROM), a keyboard controller (KBC), a realtime clock (RTC), CMOS RAM (CRAM), among other things.

The system of FIG. 14 also includes a write-back cache subsystem 224 which is coupled to the HA address lines 205 of host bus 201, to the MCC 213, and to the HD data lines 204 of host bus 201.

More specifically, the cache subsystem 224 includes a cache tag RAM 224A, a dirty bit RAM 224B, and a cache data RAM 224C. All three of these RAMs are addressed by low-order address bits from the host bus HA lines 205. The data leads of the cache tag RAM 224A are connected bi-directionally to the MCC 213, as is the one-bit data lead of the dirty bit RAM 224B. The data leads of cache data RAM 224C are coupled bi-directionally to the host bus HD lines 204. Additionally, although not shown in FIG. 14, the MCC 213 generates a write enable signal for each of the RAMs 224A, 224B and 224C in the cache subsystem 224.

The system of FIG. 14 further includes the EISA bus controller (EBC) 220 mentioned above, which is further coupled to the host bus 201 control lines 206 and address lines 205, and to the EISA bus 202 control lines 209 and address lines 208. The EBC 220 is also coupled via bi-directional buffers 226 to the ISA bus 203 control lines 211 and address lines 210. The EBC 220 further provides and receives control signals to/from the integrated system peripheral 221.

The integrated system peripheral (ISP) 221 is coupled to host bus 201 address lines HA(31:16), XD data bus 219, and EISA bus 202 control lines 209, data lines SD(7:0), and address lines LA(7:22) and SBE. ISP 221 is further coupled via bi-directional buffers 228 to EISA bus 202 address lines LA(15:8).

The HA address lines 205 of host bus 201 are coupled via bi-directional buffers 230 to the LA address lines 208 of EISA bus 202. Bi-directional buffers 232 are coupled to SD data lines 207 of the EISA bus 202 for the purpose of swapping data bytes. The address lines 208 of EISA bus 202 are further coupled to provide information via a latch and buffer 234 to the SA address lines 210 of ISA bus 203, which are in turn are coupled via a buffer in the latch/buffer 234 to provide information to the address lines 208 of EISA bus 202. An additional latch 236 couples other bits of address lines 208 of EISA bus 202 to the SA address lines 210 of ISA bus 203. The EBC 220 generates control signals for the buffers 218, 230 and 232 and latch/buffer 234. An EISA add-on device 240 is also shown coupled to the address, data and control lines of EISA bus 202.

The EBC 220, MCC 213, ISP 221 and DBC 216 are, respectively, 82C681, 82C682, 82C686 and 82C687 chips available from OPTi, Inc., Santa Clara, Calif. These chips are incorporated by reference herein, as is the databook publication OPTi-386/486 WB EISA Chipset (1991) describing these chips. The chipset is designed for systems running at host CLK frequencies of up to 50 MHz. Details of the OPTi EISA chipset other than as set forth herein are generally not important to an understanding of the invention and therefore will not be described.

The MCC 213 controls accesses to the local memory subsystem from the CPU 212, EISA/ISA masters and DMA devices. The memory subsystem consists of up to 4 banks of 1M/4M/16M×36 DRAM using optional hidden refresh, and up to 512 kB of write-back cache. The cache may be two-way interleaved for 486-compatible systems. The MCC 213 has an integrated write-back cache controller with tag comparator which supports cache writes as well as reads. Cache sizes of 64 kB, 128 kB, 256 kB, and 512 kB are supported. The MCC 213 operates in non-pipeline mode with a 16-byte line size (optimized to match a 486 burst fill cycle) in order to simplify the motherboard design without increasing cost or degrading performance. For 486-compatible systems, this secondary cache operates independently of and in addition to the cache which is internal to the CPU 212. The built-in tag comparator in MCC 213 internally detects a cache kit by comparing the addressed memory location high-order address bits with the tag bits of the current cache entry. When a match is detected, and the location is cacheable, a cache-hit cycle takes place. If the comparator does not detect a match, or if a permanently or programmably non-cacheable location is accessed (based on the internal non-cacheable region registers or the shadow control registers), the current cycle is a cache-miss.

A "dirty bit" in Dirty Bit RAM 224B corresponds to each tag entry to indicated whether the data in the cache has been modified since it was loaded from secondary memory. This allows the MCC 213 to determine whether the data in the associated secondary memory location is "stale" and needs to be updated from cache before a new line from secondary memory overwrites the currently addressed cache line. The writeback cycle causes an entire cache line (16 bytes) to be written back to secondary memory followed by a line burst from the new secondary memory location into the cache and CPU.

The cache/DRAM controller in the MCC 213 ensures that data is burst into the CPU 212 whenever the 486 requests an internal cache line fill (read cycles to cacheable memory not currently in the CPU's internal cache). The secondary cache provides data on secondary cache read-hits and the DRAM provides data during secondary cache read-misses. For secondary cache read-hits, the MCC 213 asserts BRDY# (Burst Ready) at the beginning of the first T2 state when zero wait states are required and at the beginning of the second T2 state when one wait state is required. BRDY# is asserted after the cache memory is updated for secondary cache read-misses. Once asserted, BRDY# stays active until BLAST# (Burst Last) is detected from the CPU 212. BRDY# is never active during DMA and EISA master cycles.

In 486-compatible systems, the MCC 213 allows the cache SRAMs to be interleaved in order to improve burst performance without having to use faster SRAMs. This interleaving is automatically selected whenever two banks of SRAMs are installed (64 kB and 256 kB cache systems).

The following cache cycles are possible with the MCC 213:

Cache-Read-Hit, initiated by CPU. The cache memory provides data to the CPU. For 486-compatible systems, the MCC follows the CPU's burst protocol in order fill the processor's internal cache line.

Cache-Read-Hit, initiated by EISA/ISA/DMA Master. The cache memory provides the requested data.

Cache-Read-Miss (Dirty bit negated), initiated by CPU. The MCC 213 does not need to update DRAM with the cache's current data because that data is unmodified. The cache controller asserts the write enable for cache tag RAM (TAGWE#), causing the cache tag RAM 224A to update its address information, and asserts the write enable for cache data RAM (CAWE#), causing the cache data RAM to store new information from memory. This new data is presented to the CPU 212 (following burst protocol for 486 systems).

Cache-Read-Miss (Dirty bit negated), initiated by EISA/ISA/DMA Master. DRAM provides the data, the cache is bypassed.

Cache-Read-Miss (Dirty bit asserted), initiated by CPU. The cache controller first updates secondary memory with data from the cache location that is going to be overwritten. The controller writes the 16-byte line from cache memory to the DRAM, then reads the new line from DRAM into cache memory and deasserts the DIRTY bit. The MCC asserts TAGWE#, CA- WE#[3:0] and the dirty bit write enable signal (DIRTYWE#).

Table V summarizes the cache SRAM requirements of the MCC.

TABLE V

| Cache Size | Interleaved | DIRTY Bit | Tag Field Address | Tag RAM Size | Cache RAM Address | Cache RAMs | Cacheable Main Memory |
|---|---|---|---|---|---|---|---|
| 64kB | Yes | 4kx1 | A24–A16 | 4Kx9 | A15–A4 | 8–8Kx8 | 32MB |
| 128kB | No | 8kx1 | A25–A17 | 8Kx9 | A16–A4 | 4–32Kx8 | 64MB |
| 256kB | Yes | 16kx1 | A26–A18 | 16Kx9 | A17–A4 | 8–32Kx8 | 128MB |
| 512kB | No | 32kx1 | A27–A19 | 32Kx9 | A18–A4 | 4–128Kx8 | 256MB |

Cache-Read-Miss (Dirty bit asserted), initiated by EISA/ISA/DMA Master. DRAM provides the data, the cache is bypassed.

Cache-Write-Hit, initiated by CPU. Because the present embodiment implements a write-back cache, the cache controller does not need to update the slower DRAM memory. Instead, the controller updates the cache memory and sets the DIRTY bit. (DIRTY may already be set, but that does not affect this cycle). The ability to cache write-hit cycles boosts performance over write-through caches, especially on a string of consecutive write-hits, because each write cycle completes as fast as the SRAM can respond without having to wait for a slower DRAM cycle to complete.

Cache-Write-Hit, initiated by EISA/ISA/DMA Master. Data is written to both the cache and DRAM. EADS# is asserted to the 486 CPU 212 to invalidate its internal cache line in order to maintain cache coherency. The dirty bit is unchanged.

Cache-Write-Miss, initiated by CPU or by EISA/ISA/DMA Master. The cache controller bypasses the cache entirely and writes the line directly into DRAM. DIRTY is unchanged.

Up to three independent areas of memory can be defined as non-cacheable by the MCC. This is accomplished by programming Non-Cacheable-Area registers (NCA0, NCA1, NCA2) as set forth below with a starting address and block size for each region selected. Allowable block sizes range from 64 kB to 512 kB.

Because DRAM accesses are much faster then EPROM accesses, the MCC provides shadow RAM capability to enhance system performance. As with the system of FIG. 1, data may be read from EPROM, then write-protected into a dedicated area in DRAM having the same address range. Accesses to the specified EPROM space thereafter are redirected to the corresponding DRAM location. Shadow RAM addresses range from C0000h to FFFFFh. 16 kB granularity is provided for the address range C0000h to EFFFFh while the 64 kB range from F0000h–FFFFFh (the location of system BIOS) is shadowable as an entire segment. Shadow control is provided by internal registers in the MCC. Additionally, these registers can selectively set some of the range C0000h–FFFFFh as cacheable.

Table VI describes the signal connection pins of MCC 213.

TABLE VI

| | | |
|---|---|---|
| CLOCK AND RESET | | |
| CLK | I | Host Clock. Master single-phase CPU clock driven from an external clock-generator circuit. In 486 based systems, it is the same signal that the CPU receives. In 386 systems, it is the single-phase version (half the frequency) of the CPU clock. |
| CLK2 | I | Clock2. This input is driven from an external oscillator circuit without any external division. In systems at or below 33 MHz, this clock signal input is twice the CPU's rated frequency. This is the same clock signal that drives the CPU in 386 systems. CLK2 is used for CAWE[3:0]# generation if the cache's Early Write Enable feature is turned on (Reg C31h <0> is set). |
| RST# | I | Reset. RST# is an input from the EBC that resets the MCC (this same reset signal is also connected to the ISP, DBC, and 8042). The EBC asserts this signal based on powergood and reset switch function. ('#' indicates active low signal.) |
| Address/Status | | |
| HA[31:2] | I | Host Address Bus. Connected to the Host CPU A[31:2]bus. The MCC uses these 30 address lines for internal memory decoding and to generate the memory address bus (MA[11:0]).and the low-order cache addresses (CAA3_[1:0], CAA2). The HA[31:2] bus is also used to determine all MCC internal register decodes. |
| GATEA20/TSEL | I | GATEA20 or Test Mode Select. This input pin serves two functions. Normally, it serves as the GATEA20 input from the keyboard controller (Output P21 of the 8042). This input, along with the internal Fast GATEA20 register (Reg C30h<0>), is used to generate A20M#. The second function of this pin is to allow the MCC to enter its Tristate test mode. The MCC will |

TABLE VI-continued

| | | |
|---|---|---|
| | | enter this test mode when GATEA20/TSEL is sampled High AND GT1M#/TMOD# is sampled low at the trailing edge of RST#. |
| A20M# | O | A20 Mask. This output determines whether Host Address A20 should be forced low (to emulate the address wraparound at 1MB on the 8086). 486 based systems receive this signal directly (because of their internal cache). 386 systems require the masking to take place externally, so for these systems, A20M# is connected to the A20M# input of the EBC. |
| HBE[3:0]# | I | Host Byte Enables [3:0]. Connected to Host CPU BE[3:0]#. These signals determine valid bytes during DRAM/cache writes and MCC internal register accesses. |
| HM/IO# | I | Host Memory/IO#. Connected to Host CPU M/IO#. This is sampled at the same time at HA[31:2]. This signal is not used by ISA Masters. |
| HD/C# | I | Host Data/Control#. Connected to Host CPU D/C#. This is sampled at the same time as HA[31:2]. |
| HW/R# | I | Host Write /Read#. Connected to ISP & Host CPU W/R#. This is sampled at the same time as HBE[3:0]# except for ISA masters, when it is not used. |
| Host Interface | | |
| 386/486# | I | CPU Select. Hardware strapping pin to distinguish between 386 and 486 systems. |
| HADS# | I | Host Address Status. Connected to Host CPU ADS#. This is sampled at the rising edge of CLK, and when active, indicates valid address/status on the host address bus. |
| BLAST#/ EBCRDY# | I | Burst Last or EBC 386Ready. The function of this pin is determined by the processor type. For 486 systems, this is the BLAST# signal from the CPU and is sampled on the rising edge of CLK except in T1 and the first T2. In 386 systems, this is connected to the HRDY0# signal from the EBC. The MCC internally OR's this signal along with any coprocessor ready signal to produce the BRDY# output, which is fed to the 386 CPU. |
| RDY1#/ 387RDY1# | I | 486 Ready In or 387 Ready1. The function of this pin is determined by the processor type. It is directly connected to the RDY# pin of the CPU for 486 systems and is used by other devices to indicate the end of the current cycle. In most 386 systems, RDY0# from the 387/3167 must be cascaded through the MCC. In this case, 387RDY1# is connected to READY0# from the numeric coprocessor. In all other 386 systems, this pin is left floating (a weak internal pull-up is provided). |
| 387RDY2# | B | 387 Ready2. This pin is unused and should be tied high in 486 systems. In most 386 systems, RDY0# from the 387/3167 is cascaded through the MCC via 387RDY1#. In this case, 387RDY2# should be pulled high. In the special case where the 387/3167 READY0# is OR'D externally with the MCC's BRDY#, the READY0# from the coprocessor should be connected to 387RDY2# and 387RDY1# should be left unconnected. This second case is not recommended above 25 MHz. |
| BRDY# | B | Burst Ready. This signal is connected to the BRDY input of the 486 or to the READY# input of the 386. The MCC drives this line active (low) to indicate the end of a host CPU to local memory cycle. After being active, it is driven high (inactive) for one clock and then tristated. In 386 systems, it is also driven low for a CLK after EBCRDY# or 387RDY# is sampled active. |
| Arbiter | | |
| HHLDA | I | Host Hold Acknowledge. Connected to HHLDA from the host CPU. This indicates an EISA/ISA/DMA/Refresh access. |
| EMSTR16# | I | ISA Master. This input, from the ISP, indicates that an ISA master is in control of the Host/EISA bus. |
| MCCRDY | O | MCC Ready. This normally active (high) signal goes inactive (low) when a hidden refresh cycle is pending and returns active when the refresh cycle is over. It is connected to the EBC MCCRDY input. |
| Bus Interface | | |
| BCLK | I | EISA BCLK. EISA system clock. Conencted from BCLK of the EISA connectors. |
| START# | I | Start. This input indicates the beginning of an EISA/DMA/Refresh access and is connected to START# of the EISA connectors. |
| CMD# | I | Command. Provides timing control within an EISA |

TABLE VI-continued

| | | |
|---|---|---|
| | | cycle. Connected to CMD# of the EISA connectors. |
| MSBURST# | I | Master Burst. This input is sampled at the rising edge of BCLK and indicates that an EISA burst mode transfer should be carried out. It is connected to MSBURST# of the EISA connectors. |
| REFRESH# | I | Refresh. Connected to REFRESH# of the EISA connectors. The leading edge of MRDC# is interpreted as a request to perform hidden refresh when this signal is active. |
| MRDC# | I | Memory Read Command. The MCC uses this input to indicate a DRAM/Cache read from a master device (EMSTR16# active). Also, when REFRESH# is active, the leading edge of MRDC# is interpreted as a request to perform hidden refresh. Connected to MRDC# of the EISA connectors. |
| MWTC# | I | Memory Write Command. When EMSTR16# is active, the leading edge of MWTC# is used to start a DRAM/cache write. Connected to MWTC# of the EISA connectors. |
| Decode | | |
| HKEN# | O | Host cache enable. Connected to the KEN# of the 486. It is based on a decode of HA[31:17] and will be active for cacheable regions of memory. This signal is forced active from the end of a CPU cycle to the end of the first T1. |
| HLOCM# | O | Host Local Memory. Inhibits EISA/ISA cycle if active during a local Host master cycle. Connected to HLOCM# of the EBC. |
| GT1M#/TMOD# | B | Greater than 1MB or Test Mode. This pin serves two functions. This signal uses HA[31:20] and A20M# to decode memory accesses above 1MB (inactive for accesses in the 000XXXXXh range). It is connected to GT1M# of the EBC. The second function of this pin is to force the MCC into test mode. The MCC will enter its test mode when this pin is sampled low on the at this sample point for the Tristate test mode to be entered. A weak internal pull-up keeps GT1M#/TMOD high during RST# if no outside source/tester is driving it. |
| ROMCS0# | O | ROM Chip Select 0. During normal operation, it goes active when FFFFXXXXh or FXXXXh is decoded from HA[31:16]. It is connected to CS# of the BIOS ROM. |
| ROMCS1# | O | ROM Chip Select 1. ROMCS1# decodes a 16K/32K/64K block in the range C0000h thru EFFFFh based on the value programmed into the MCC's ROM/Shadow RAM configuration registers (C36h-C3Fh). |
| DRAM Interface | | |
| MA[11:0] | O | Multiplexed DRAM addresses. This bus provides row and column address information to the DRAMs. External buffering is typically required. Note that for EISA master accesses, the HA bus should drive the MA through transparent latches. |
| RAS#[3:0] | O | Row Address Strobes. Each RAS output corresponds to one DRAM bank of four bytes. |
| CAS3#[3:0] CAS2#[3:0] CAS1#[3:0] CAS0#[3:0] | O | Column Address Strobes. CAS0#_[3:0] connects to byte lanes 3 thru 0 of DRAM bank-0. Similarly, each set of four CAS lines corresponds to a particular 4-byte bank. To guarantee EISA memory access timing, these CAS signals should be connected directly (without external buffering) to the local memory DRAMs. |
| WE# | O | Write Enable. This signal is externally buffered to drive the WE# input of the DRAM's. WE# transitions with similar timing to RAS[3:0]#. |
| Cache Interface | | |
| TAG27/18 TAG26/17 TAG25/16 TAG[24:19] | B | Cache Tag Data Bus. Connected to the tag SRAM data bus. The tag number corresponds to the Host address line that it will be compared against. The tag bus is always 9 bits wide. For CPU accesses, the tag bits are sampled at the falling edge of CLK in the first T2. For EISA/DMA, they are sampled at the rising edge of BCLK30. For ISA masters, they are sampled at the leading edge of MRDC# or MWTC#. |
| TAGWE# | O | Tag Write Enable. Connected to tag SRAM WE#. This signal is active during CPU read-miss cycles when the cache gets updated. |
| DIRTY | B | Dirty bit. The dirty bit indicates whether the data in the cache has been modified. It is sampled on the rising edge of CLK on the first T2 of a CPU read miss cycle. It is connected to the data pin of the dirty-bit SRAM. |
| DIRTYWE# | O | Dirty bit Write Enable. This signal goes active when |

TABLE VI-continued

| | | |
|---|---|---|
| | | the host CPU writes into the cache. It is connected to the WE# pin of dirty-bit SRAM. |
| XCA30E# | O | External Cache address 3 Output Enable. Allows the CPU address lines HA2 and HA3 to drive the cache SRAM. Connected to the OE# of the buffer between HA2, HA3 and CAA3[1:0], and CAA2. |
| CAA31 | O | Cache Altered Address 3 (odd). Connected to cache bank-1 A3 for the 486 and to A3 of the entire cache for the 386. |
| CAA30 | O | Cache Altered Address 3 (even). Connected to cache bank-0 A3 for 486 systems. |
| CAA2 | O | Cache Altered Address 2. Connected to the cache address line A2. |
| HACALE | O | HA bus to CA bus Latch Enable. This output provides the proper control timing to the latches that create the cache address bus CA[18:4] from the HA bus. This normally active signal goes inactive at the end of a host write or EISA/DMA access to provide sufficient hold time on the CA bus. |
| CACS#[1:0] | O | Cache Memory Chip Selects. Connected to cache-memory CS# for odd & even banks respectively. These outputs are dependent upon the DRAM size, shadow -control, and cache mode bits. When the cache is interleaved (486), these normally active signals go inactive when there is a cache write to the opposite bank of cache. |
| CAOE# | O | Early Cache Output Enable. This signal functions as an output enable for the cache SRAMs with slightly earlier timing than CDOE# and with fewer decoding restrictions. It is typically unused. |
| CAWE[3:0]# | O | Cache Write Enables. Connected to cache-memory WE# pins for byte lanes 3 thru 0. These signals are derived from CLK2 if the MCC's Early Write Enable feature is set (Reg C31<0> = 1). |
| Data/Parity | | |
| CDOE[1:0]# | O | Cache Data Output Enable. Used to enable data from the cache SRAM onto the local HD bus. For 486 systems, CDOE0# is always controls the low cache data SRAM bank and CDOE1# is used for the upper bank only when cache interleaving is selected (64k/256k cache size). For 386 systems, either signal can be used. In both cases, CDOE# will go high when HA31 is high. |
| XD[3:0] | B | X-Data Bus. The MCC uses the low-order nibble of the XD bus to provide the programming data for its internal registers. The upper four bits are ignored during I/O programming cycles to the MCC. |
| MDHDOE# | O | Memory to Host Data Output Enable. This control signal enables instructs the DBC to enable data from the MD onto the HD bus for CPU DRAM reads. It is connected to MDHDOE0# of the DBC. |
| MDHDCLK | O | MD/HD Clock. This normally high signal is the clock used by the DBC's internal master-slave flip-flop between MD and HD busses. It is similarly used to clock the MP bits for parity checking. This signal should be connected to MDHDCLK of the DBC |
| HDMDLE# | O | HD/MD Latch Enable. This normally active signal goes inactive during cache write-back cycles for one CLK when CAS# goes active. It is connected to HDMDLE# of the DBC. |
| HDMDOE# | O | HD/MD Output Enable. This signal enables the HD bus onto the MD bus and is active for all CPU memory writes except cache hit cycles. It is connected to HDMDOE# of the DBC |
| PAREN# | O | Parity Enable. PAREN# provides a timing pulse to the DBC after valid DRAM data has been read into the DBC. This pulse is used as the timing strobe to check for parity errors. It is connected to PAREN# of the DBC. |
| EISA-Timing Signals | | |
| BCLK15 | I | BCLK-15. 15ns delayed version of BCLK from the external delay line. |
| BCLK30 | I | BCLK-30. 30nS delayed version of BCLK from the external delay line. |

The EBC 220 generates the EISA bus clock (BCLK) as well as the keyboard clock while also providing board level and CPU/Coprocessor reset signals. In addition, the EBC controls the interface between the EISA bus and the Host bus and arbitrates between Host/EISA/ISA Masters, DMA controllers, and Refresh requests for the EISA bus. It directs the steering logic of the DBC 216 and the ISP 221 and provides latch/buffer controls for address/data byte lane translation/swapping. Additionally, it provides the address translation between masters and slaves for addresses A20 and A[1:0].

The EBC interfaces directly with the local CPU 212 on the Host bus 201. This interface is used to track host bus cycles when the CPU 212 or other local device is the current master on the host bus 201. When a host cycle is initiated, the EBC 220 determines whether any local slave is responding. If a local device is not the target of the cycle, then the EBC 220 will activate its EISA/ISA interface logic to complete the instruction. The EBC 220 waits until the completion of the EISA/ISA portion of the cycle before terminating the cycle on the host bus 201.

The EISA/ISA interface of EBC 220 monitors cycles initiated by EISA or ISA masters and watches their corresponding buses to detect a slave response. The correct cycle will then be generated on the responding slave's bus (EISA or ISA). The EISA/ISA interface accepts cycles from the host interface and will run the appropriate cycles on the EISA or ISA bus 202 or 203. If necessary, the EISA/ISA interface will perform multiple cycles (assembly/disassembly) for a single host cycle. When the translation is completed, the host interface is informed to terminate the cycle on the local bus. The EISA/ISA interface also informs the host interface when the host can change the address for the next cycle. The individual pin connections for the EBC 220 are set forth in the above-mentioned OPTi EISA Databook.

The ISP 221 is an integrated system peripheral chip which integrates two timers, EISA NMI/Time-out logic, two modified 88259-type interrupt controllers, the EISA DMA/Refresh controller, and the EISA system arbiter. It also integrates the logic required to create the local peripheral bus (XD-bus 219) by providing internal buffering between SD[7:0] on EISA bus 202 and XD[7:0]. Also, data read from internal ISP 221 registers is presented directly on the SD bus. A description of the individual pin connections of the ISP 221 may be found in the above-mentioned OPTi EISA Databook.

The DBC 216 performs various steering logic and control/decode functions. It integrates data buffers and provides data buffer control, XD 219 bus control, AEN generation, parity generation/checking logic, decode logic for an external keyboard controller, real time clock control, system configuration RAM control as well as EISA ID register support and general purpose chip selects.

The DBC 216 performs data bus conversion when a system master accesses 8, 16, or 32-bit devices through 16-bit or 32-bit instructions. The DBC 216 also handles DMA and EISA bus master cycles that transfer data between local DRAM or cache memory and locations on the EISA bus 202. The DBC receives data buffer control signals from the EBC 220 and the ISP 221. It generates XD bus control signals XDEN# and XDRD#.

The DBC 216 also generates chip select signals for the keyboard controller, real time clock chip, configuration non-volatile-memory (NVM) and the configuration registers in EBC 220. It also generates control logic based on address decoding for numeric coprocessor error clearing, the EISA ID register, the real time clock chip, configuration NVM and Fast CPU warm resets. A description of the pin connections of the DBC 216 may be found in the above-mentioned OPTi EISA Databook. It is sufficient only to mention here that one of the input pins of DBC 216 receives PAREN# from the MCC 213, and that one of the output pins of DBC 216 (PARITY#) indicates whether a parity error has occurred while PAREN# was active.

As with the chipset of FIG. 1, the chipset in the system of FIG. 2 operates in response to a plurality of command and configuration registers which may be written to or read from by the CPU 212. Unlike the system of FIG. 2, however, these registers are directly addressable in the I/O address space. Most values are written once during the system power-on sequence in response to instructions in system BIOS ROM 222 (FIG. 14). The fields of the registers also are mostly not important to an understanding of the invention and may be determined from the above-mentioned OPTi EISA Databook. The MCC 213 has several register fields which may be relevant, however, and these are described below in Table VII.

TABLE VII

| Cache Configuration Register 1 I/O Addr C32h, Bits 3:2 | Indicates Cache Size and Max. cachable DRAM |
| --- | --- |
| | 32 Cache Size Cachable DRAM |
| | 00 64K 32M (default) |
| | 01 128K 64M |
| | 10 256K 128M |
| | 11 512K 256M |
| Cache Configuration Register 1 I/O Addr C32h, Bits 1:0 | Cache mode select: |
| | 00 Enable   Enables normal cache operation. |
| | 01 Disable  Disables cache. DRAM reads will invalidate the tag and clear the dirty bit. Cache memory may be completely flushed by reading a block of memory equal to the cache size. (Default). |
| | 10 Test-1   All accesses go to DRAM. Upon a DRAM read, the tag and dirty-bit is written with the values defined in I/O register C4Dh thru C4Fh. |
| | 11 Test-2   All accesses go to DRAM. Upon a read miss, the tag and dirty-bit is read into registers C4Dh thru C4Fh. |
| Shadow RAM Control Registers I/O Addr C36h, C37h, C38h, C39h, C3Ah, C3Bh, C3Ch, C3Dh, | Each 16K block between C0000h to DFFFFh can be individually shadowed. Each 16k block between C0000h to C7FFFh can also be made cachable for host CPU only. The MCC 213 will not respond in this area for EISA/DMA/ISA |

TABLE VII-continued

| | |
|---|---|
| C3Eh, C3Fh | accesses. Each 64K segment between E0000h to FFFFFh can also be controlled in the same fashion (E0000h-EFFFFh is shadowable and F0000h-FFFFFh is shadowable and cacheable). These registers are defined further below. |
| Upper-Bound-Cachable-Region Register I/O Addr C40h, Bits 3:0 | Defines the upper bound of cachable memory region as follows: |

3210 Upper Bound Cachable Region
- 0000  64M (Default)
- 0001  4M
- 0010  8M
- 0011  12M
- 0100  16M
- 0101  20M
- 0110  24M
- 0111  28M
- 1000  32M
- 1001  36M
- 1010  40M
- 1011  44M
- 1100  48M
- 1101  52M
- 1110  128M
- 1111  256M

| | |
|---|---|
| Non-cacheable Block 0 Registers I/O Addr C41h, C42h, C43h, C44h | Define the size and start address for non-cacheable memory block 0. |
| Non-cacheable Block 1 Registers I/O Addr C45h, C46h, C46h, C48h | Define the size and start address for non-cacheable memory block 1. |
| Non-cacheable Block 2 Registers I/O Addr C49h, C4Ah, C4Bh, C4Ch | Define the size and start address for non-cacheable memory block 2. |
| Tag-Bit-Test-Mode-Register I/O Addr C4Dh, Bits 3:0 | Readable/Writable register for writing any desired information to Tag RAM or reading a Tag RAM entry. |

| Register Bit | Memory Address Bit in Tag RAM |
|---|---|
| 3 | TAG19 |
| 2 | TAG27/18 |
| 1 | TAG26/17 |
| 0 | TAG25/16 |

| | |
|---|---|
| Tag-Bit-Test-Mode-Register I/O Addr C4Eh, Bits 3:0 | Readable/Writable register for writing any desired information to Tag RAM or reading a Tag RAM entry. |

| Register Bit | Memory Address Bit in Tag RAM |
|---|---|
| 3 | TAG23 |
| 2 | TAG22 |
| 1 | TAG21 |
| 0 | TAG20 |

| | |
|---|---|
| Tag-Bit-Test-Mode-Register I/O Addr C4Fh, Bits 3:0 | Readable/Writable register for writing any desired information to Tag RAM or reading a Tag RAM entry. |

| Register Bit | Memory Address Bit in Tag RAM |
|---|---|
| 3 | TAG24 |
| 2 | Unused |
| 1 | Unused |
| 0 | Dirty Bit |

The individual bits of each 4-bit field in the Shadow RAM Control Registers described in Table VII are defined as follows:

Bit-0: RE 1 enables CPU read from DRAM if bit 3 is 0
Bit-1: WE 1 enables CPU write to DRAM
Bit-2: CE 1 makes the referenced address range cachable if the range has been shadowed
Bit-3: ROM 1 enables decode of a ROM chip select output and inhibits DRAM read Table VIII defines the correspondence between the secondary memory address ranges and the 4-bit register fields which refer to them in the Shadow RAM Control Registers. Table VIII also indicates which of the above bit functions are active.

TABLE VIII

| Register Addr | Start Addr | Block Size | BIT 3 | BIT 2 | BIT 1 | BIT 0 | Default |
|---|---|---|---|---|---|---|---|
| C36h | C0000h | 4000h | ROM | CE | WE | RE | 0000 |
| C37h | C4000h | 4000h | ROM | CE | WE | RE | 0000 |

TABLE VIII-continued

| Register Addr | Start Addr | Block Size | BIT 3 | BIT 2 | BIT 1 | BIT 0 | Default |
|---|---|---|---|---|---|---|---|
| C38h | C8000h | 4000h | ROM | | WE | RE | 0X00 |
| C39h | CC000h | 4000h | ROM | | WE | RE | 0X00 |
| C3Ah | D0000h | 4000h | ROM | | WE | RE | 0X00 |
| C3Bh | D4000h | 4000h | ROM | | WE | RE | 0X00 |
| C3Ch | D8000h | 4000h | ROM | | WE | RE | 0X00 |
| C3Dh | DC000h | 4000h | ROM | | WE | RE | 0X00 |
| C3Eh | E0000h | 10000h | ROM | | WE | RE | 0X00 |
| C3Fh | F0000h | 10000h | ROM | CE | WE | RE | 1000 |

Figure 15:
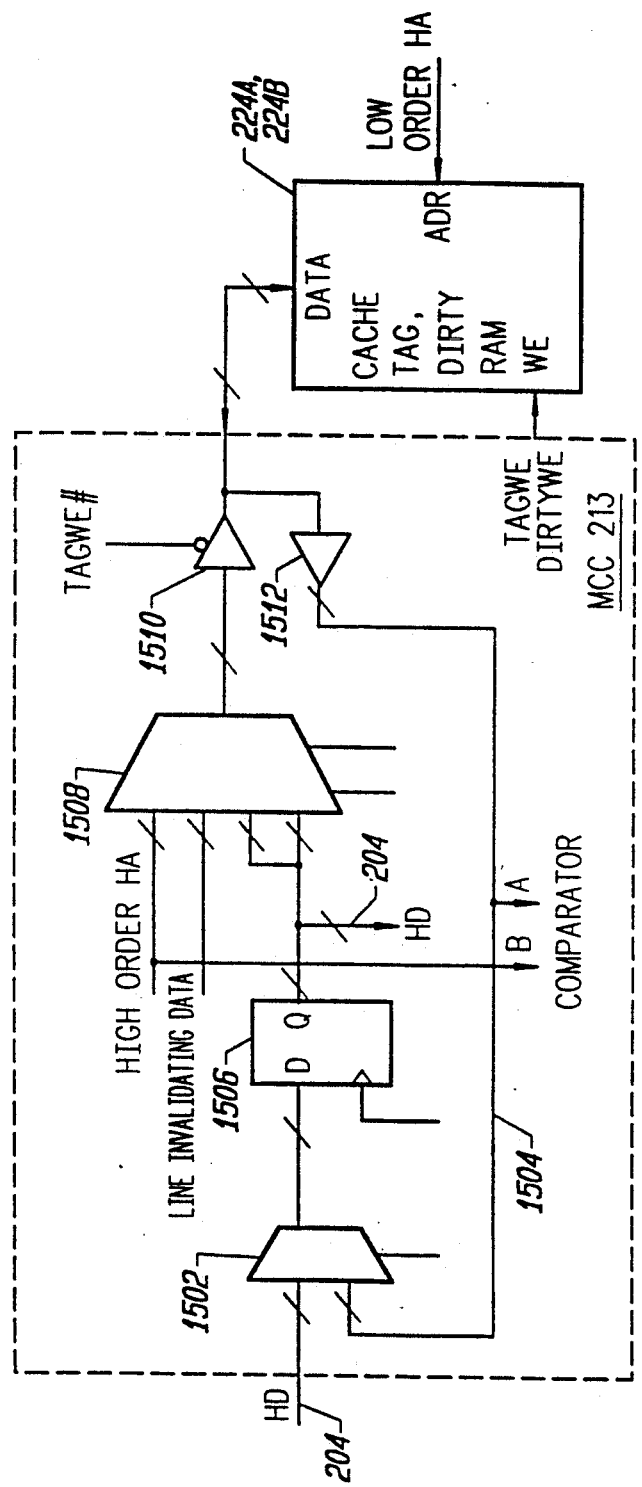
FIGS. 15-18 are logic diagrams of circuitry in the MCC of FIG. 14.

FIG. 15 is a simplified block diagram of apparatus in the system of FIG. 14 which implements the invention. Within MCC 213, a two-input multiplexer 1502 selects data from either the host data bus 204 or an internal bus 1504 to be applied to the data inputs of a configuration register 1506. The output of register 1506 can be provided back to the HD lines 204, and is also provided to two-input ports of four-input multiplexer 1508. Another input of multiplexer 1508 receives the appropriate high-order address bits from HA lines 205, for normal operation of the cache memory 224. Yet another input port of multiplexer 1508 receives cache line invalidating data which, as will be seen, is a fixed value which always associates the cache data line indicated by the low-order HA address bits, with a line in secondary memory which is non-cacheable. If the cache size is too large such that the address bits needed to refer to the non-cacheable secondary memory block are not all stored in the cache tag RAM, a different fixed value is provided as the line invalidating data which associates the current cache data line with a secondary memory line in a newly defined block of non-cacheable secondary memory located high in the main memory address space. The output of multiplexer 1508 is provided to three-state buffer 1510, the output of which is connected externally to the data leads of the cache tag and dirty RAMs 224A and 224B. These leads are also connected back internally via an input buffer 1512 to the lines 1504 connected, as previously described, to an input port of multiplexer 1502. The high-order HA bits which are provided to a port of the multiplexer 1508 are also provided, together with the tag data bits on bus 1504, to respective B and A inputs of a cache tag match comparator (not shown in FIG. 15).

The MCC 213 also generates write enable signals for the cache tag and dirty bit RAMS. Each write enable signal comprises a falling edge followed by a rising edge, data being clocked into the RAM in response to the rising edge. The output enables for these RAMs are permanently tied active, so they will always drive their respective data buses except while the write enable is low, at which time the MCC 213 drives the data buses.

Figure 16:
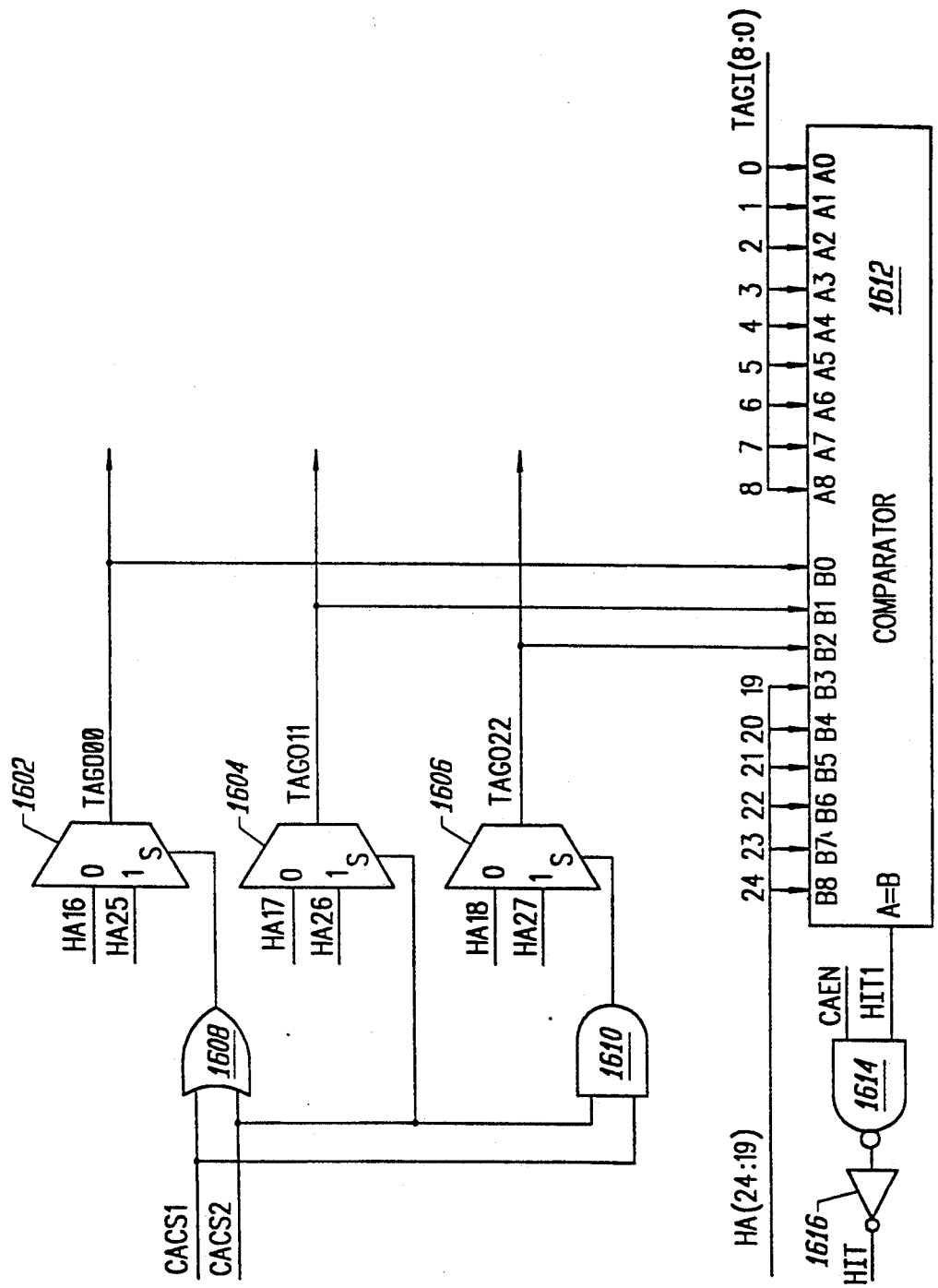
Figure 17A:
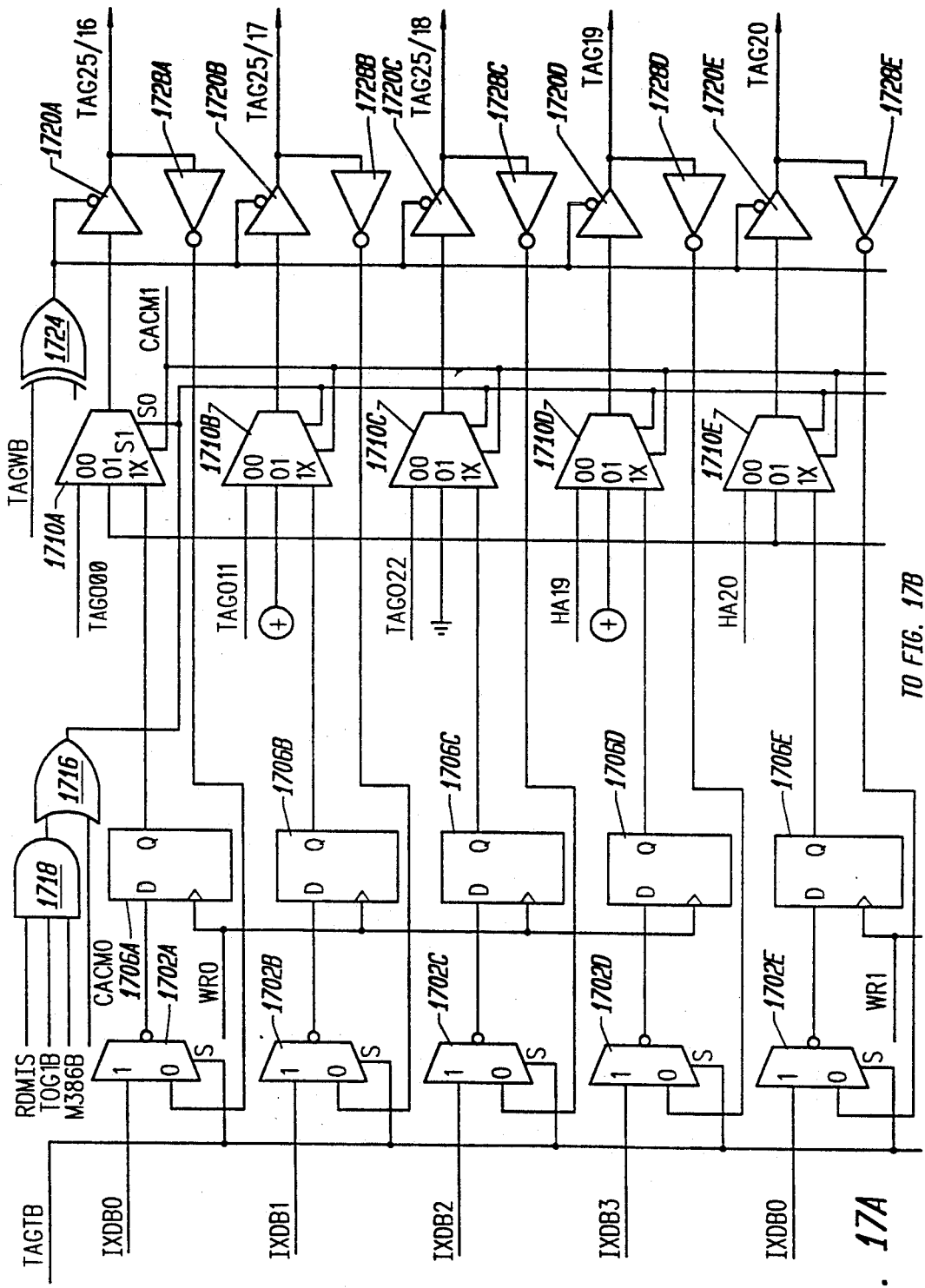
Figure 17B:
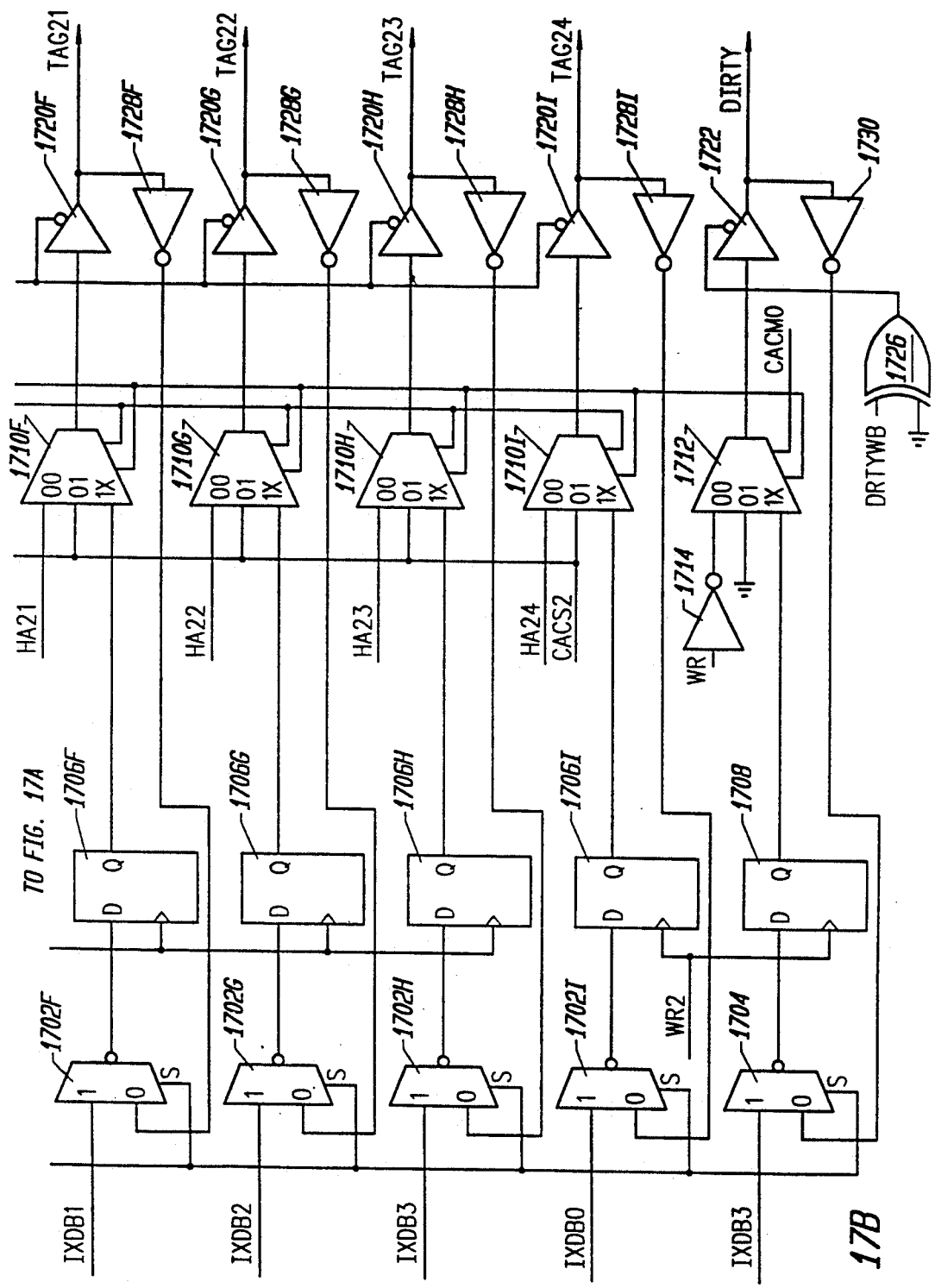
Figure 18:
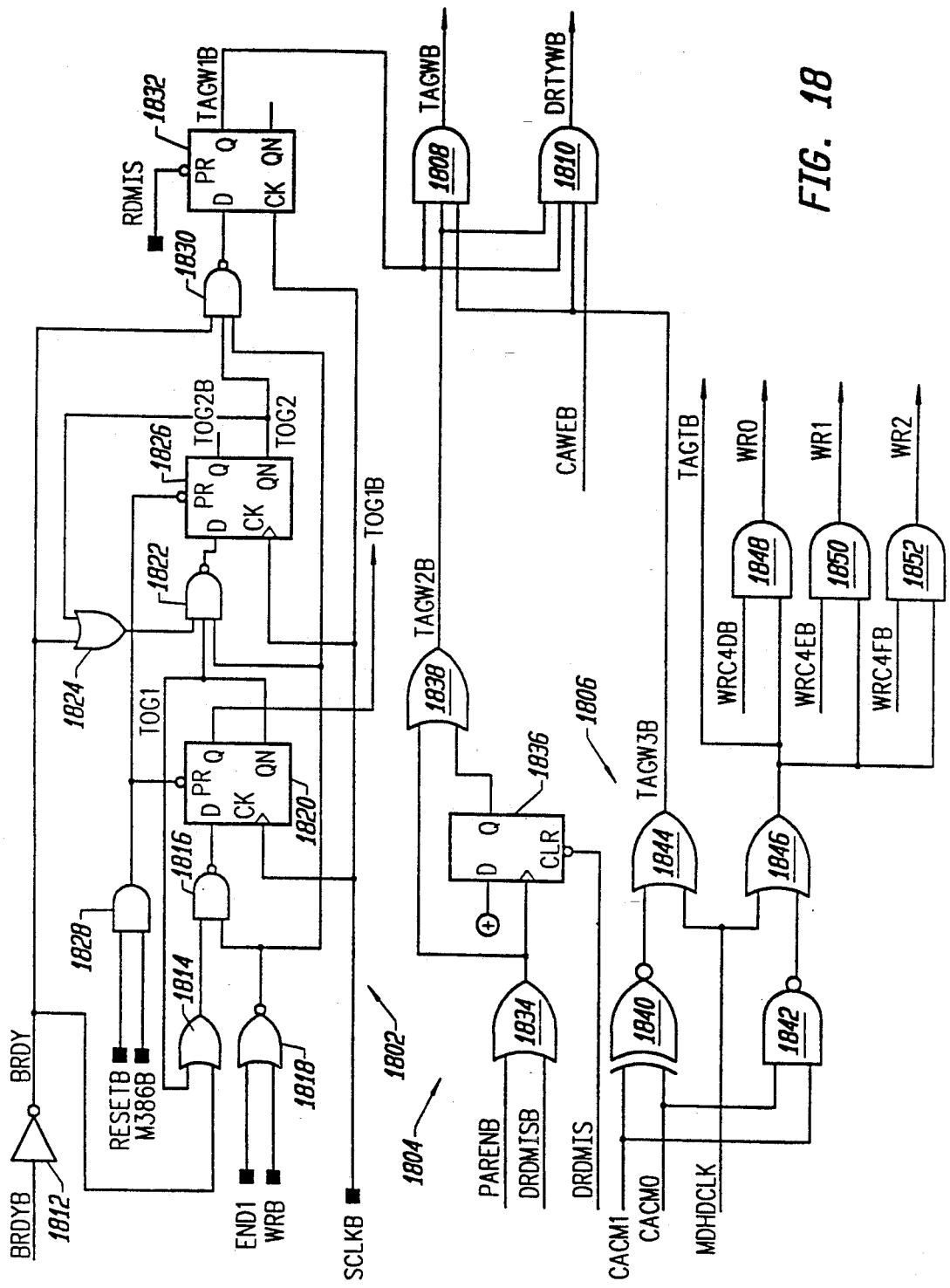

FIGS. 16, 17 and 18 show the circuitry of FIG. 15 in more detail. FIG. 16 shows the selection of three of the high-order HA bits, the remaining ones of such bits being coupled directly from the HA lines 205. FIG. 16 shows the use of the high-order address bits in a tag match comparator. FIG. 17 shows the multiplexers 1502 and 1508, the registers 1506 and the buffers 1510 and 1512 (FIG. 15) in more detail. FIG. 18 shows control circuitry of FIGS. 16 and 17 and which generates write enable signals for the cache tag and dirty bit RAMs.

Referring to FIG. 16, three multiplexers 1602, 1604 and 1606 are provided to generate TAGO00, TAGO11 and TAGO22, the three low-order bits written to the cache tag RAM 224A during normal cacheable system operation. As mentioned above, the system of FIG. 14 can be used with a 64k, 128k, 256k or 512k-byte cache as specified in register C32h, bits 3:2. As with the system of FIG. 1, each cache size requires a different set of address bits for addressing the cache tag RAM 224A, dirty bit RAM 224B, and cache data RAM 224C. Accordingly, a different set of address bits must be stored as tag data in the cache tag RAM 224A. In order to maintain the nine-bit width of cache tag RAM 224A, three of its tag data bits are multiplexed. Table IX explains this in more detail. The four different available cache sizes are shown on four separate lines in the table. The register C32h(3:2) code corresponding to each cache size is shown in the first and second columns. The third column indicates the cache size, and the fourth column states which bits of the CPU address bus HA are used to address the cache tag RAM 224A. Since each entry in the cache contains a line of 16 bytes of data, HA(3:0) are not needed to address an entry in the cache tag RAM 224A. Thus, for a 64k-byte cache, only HA(15:4) are necessary to address the cache tag RAM 224A as indicated in the table. Similarly, for a 128k-byte cache, HA(16:4) are needed. HA(17:4) are needed to address a 256k-byte cache, and HA(18:4) are needed to address a 512k-byte cache.

The tag data stored in cache tag RAM 224A is always the next nine address bits above the bits which are used to address the cache tag RAM 224A. Thus, for a 64k-byte cache, HA(24:16) are stored as a tag. In a 128k-byte cache, HA(25:17) are stored as the tag. In a 256k-byte cache, HA(26:18) are stored as the tag, and in a 512k-byte cache, HA(27:19) are stored as the tag. Since it does not matter in which order the various bits of a tag are stored in the cache tag RAM 224A, as long as they are read in the same order that they are written, the computer system of FIG. 14 stores them in a manner which minimizes the circuitry required to alter which bits are stored. Similarly to the table of FIG. 13, Table IX indicates which HA bits are stored in the various cache tag RAM 224A data bits for each cache size.

TABLE IX

| C32h (3) | C32h (2) | Cache Size | Bits Used to Address Tag RAM | TAG(8:3) | TAG(2) | TAG(1) | TAG(0) | Indicated Main Memory Block |
|---|---|---|---|---|---|---|---|---|
| 0 | 0 | 64kB | HA (15:4) | HA (24:19) | HA(18) | HA(17) | HA(16) | A0000h AFFFFh |

TABLE IX-continued

| C32h (3) | C32h (2) | Cache Size | Bits Used to Address Tag RAM | TAG(8:3) | TAG(2) | TAG(1) | TAG(0) | Indicated Main Memory Block |
|---|---|---|---|---|---|---|---|---|
| 0 | 1 | 128kB | HA (16:4) | HA (24:19) | HA(18) | HA(17) | HA(25) | A0000h BFFFFh |
| 1 | 0 | 256kB | HA (17:4) | HA (24:19) | HA(18) | HA(26) | Ha(25) | 7F80000h 7FBFFFFh |
| 1 | 1 | 512kB | HA (18:4) | HA (24:19) | HA(27) | HA(26) | HA(25) | 7F80000h 7FFFFFFh |

As shown in FIG. 16, the '0' input of multiplexer 1602 is connected to receive HA16, and the '1' input of multiplexer 1602 is connected to receive HA25. The '0' and '1' inputs of multiplexer 1604 are connected to receive HA17 and HA26, respectively, and the '0' and '1' inputs of multiplexer 1606 are connected to receive HA18 and HA27, respectively. Register bits C32h(3:2) are provided as signals CACS2 and CACS1, respectively, to a pair of inputs to a NOR gate 1608, the output of which is connected to the select input of multiplexer 1602. CACS1 and CACS2 are also connected to the two inputs of an AND gate 1610, the output of which is connected to the select input of multiplexer 1606. CACS2 is also connected directly to the select input of multiplexer 1604. It can be seen that multiplexers 1602, 1604 and 1606 will output on respective TAGO00, TA-GO11 and TAGO22 lines, the appropriate HA values for the three low-order tag data bits as indicated in Table IX.

The TAGO00, TAGO11 and TAGO22 leads are connected as described below with respect to FIG. 17. They are also connected to the B0, B1 and B2 inputs, respectively, of a tag match comparator 1612. Bits B(8:3) of the comparator 1612 are connected to receive HA(24:19), respectively, and bits A(8:0) are connected to receive TAGI(8:0) from bus 1504 (FIG. 15). The A=B output of comparator 1612 generates a HIT1, which is NANDed with a cache enable signal CAEN by a NAND gate 1614, and then inverted by invertor 1616 to provide a cache HIT indication. CAEN is simply the NOR of the cache mode select bits in Register C32h, bits 1:0.

Referring to FIG. 17, multiplexers 1502 (FIG. 15) are shown as individual inverting multiplexers 1702A, 1702B, . . . , 1702I (collectively 1702), and 1704. The '1' input ports of the multiplexers 1702A, 1702E and 1702I are all connected to receive an IXDB0 signal. The '1' input ports of multiplexers 1702B and 1702F are both connected to receive an IXDB1 signal; the '1' input ports of multiplexers 1702C and 1702G are connected to receive an IXDB2 and the '1' input ports of multiplexers 1702D, 1702H and 1704 are connected to receive an IXDB3 signal. The signals IXDB(3:0) are connected to receive the inverted low-order four bits of data from the HD data bus 204, when such data is being written into a register as set forth above. These leads are used when the CPU is writing to the tag-bit-test-mode-registers C4Dh, C4Eh and C4Fh. The select input of each of the multiplexers 1702 and 1704 are connected to receive a TAGTB signal, described below.

The inverting outputs of multiplexers 1702 and 1704 are connected the D inputs of respective registers 1706A, 1706B, . . . , 1706I (collectively, 1706) and 1708. These registers correspond to registers 1506 (FIG. 15). The clock inputs of registers 1706A-1706D are connected to receive a WR0 signal which indicates that a write is occurring to register C4Dh. The clock inputs of registers 1706E-1706H are all connected to a WR1 signal which indicates that a write to register C4Eh is occurring, and the clock inputs of registers 1706I and 1708 are both connected to receive a WR2 signal which indicates that a write is occurring to register C4Fh.

The Q outputs of registers 1706 and 1708 are each connected to respective third input ports of three-input multiplexers 1710A, 1710B, . . . , 1710I (collectively 1710), and 1712. These multiplexers correspond to multiplexer 1508 (FIG. 15). The first input port of multiplexers 1710A, 1710B and 1710C are connected to receive the TAGO00, TAGO11 and TAGO22 signals from FIG. 16, while the first input ports of multiplexers 1710D-1710I are connected to receive respective host bus address bits HA(19:24). The second input port of each of the multiplexers 1710B and 1710D are connected to a logic 1, and the second input port of multiplexer 1710C is connected to a logic 0. The second input ports of multiplexers 1710A and 1710E-1710I are all connected to receive the CACS2 bit from the register bit C32h(3). The first input port of multiplexer 1712 is connected to the output of an invertor 1714, the input of which is connected to receive the complement of the host bus W/R# signal, and the second input port of multiplexer 1712 is connected to a logic 0.

Each of the multiplexers 1710 and 1712 have two select inputs. The high-order select input of the multiplexers 1710 and 1712 are all connected to receive the cache mode select bit CACM1 from cache configuration register bit C32h(1) listed above. The low-order select bit of multiplexer 1712 is connected to receive the CACM0 bit from cache configuration register bit C32h(2). The low-order select bit for each of the multiplexers 1710 are all connected to the output of an OR gate 1716, one input of which is connected to receive CACM0. The other input of OR gate 1716 is connected to the output of a three-input AND gate 1718, the three inputs of which are connected to receive an RDMIS signal, a TOG1B signal and an M386B signal. RDMIS is a signal derived from the HIT output of invertor 1616, which goes high after the first T2 of a cacheable memory read cycle in which a cache miss occurs. The TOG1B signal is described below, and the M386B derives from the MCC 386/486# pin and is high only when the MCC 213 is strapped for 486-compatible CPU operation.

The outputs of multiplexers 1710 and 1712 are connected to the inputs of respective three-state buffers 1720A, 1720B, . . . , 1720I (collectively 1720) and 1722. The inverting enable inputs of the buffers 1720 are all connected to the output of an exclusive OR gate 1724, one input of which is connected to ground and the other input of which is connected to receive a TAGWB signal. The inverting enable input of buffer 1722 is connected to the output of an XOR gate 1726, one input of which is connected to ground and the other input of which is connected to receive DRTYWB. Gates 1724 and 1726 are both present for delay purposes only. The outputs of buffers 1720A, 1720B, 1720C and 1720D-I are connected to the MCC 213 bi-directional tag data pins TAG25/16, TAG26/17, TAG27/18 and TAG(19:24), respectively. The output of three-state buffer 1722 is connected to the MCC 213 bi-directional DIRTY pin. The outputs of buffers 1720 and 1722 are also connected back internally in the MCC 213 via invertors 1728A, 1728B, ..., 1728I (collectively 1728) and 1730, respectively, to the '0' input ports of respective multiplexers 1702A-1702I and 1704.

In normal operation, with the cache mode select bits in cache configuration register C32h(1:0) set at '0', when the output of AND gate 1718 is 0, all of the multiplexers 1710 and 1712 will select the appropriate high-order address bits from the HA bus 205 for outputting on the tag data bus. Multiplexer 1712 will output a 1 on the dirty bit data line if the current access is a write access (WR=0), or a 0 if the current access is a read access (WR=1). The output of AND gate 1718 will in fact be low except at certain times during a burst read operation from main memory as hereinafter described.

In cache mode '01', the multiplexers 1710 all select their output from respective ports 01. For cache sizes of 64k bytes and 128 k bytes, CACS2 (from register bit C32h(3)) is low and the output thereby provided on the TAG bus, when written to the cache tag RAM 224A, will associate the corresponding cache data line with a line of secondary memory which is within a non-cacheable block. For a 64k-byte cache, the line will be within block A0000h-AFFFFh, and for a 128 k-byte cache, the line will be within the block A0000h-BFFFFh as indicated in the last column of Table IX. These address ranges are permanently non-cacheable. For cache sizes of 256 k bytes and 512 k bytes, CACS2=1. For these cache sizes, the address bits which are selected by multiplexers 1602, 1604 and 1606 (FIG. 16) for storage in the cache tag RAM 224A are insufficient to specify a secondary memory block which is entirely non-cacheable. Accordingly, the value written to the cache tag RAM 224A will associate the corresponding cache data line with a line within a 256 k byte or 512 k byte, respectively, permanently non-cacheable block beginning at secondary memory address 7F80000h. This non-cacheable block is newly defined as such with the present invention and is located high in the secondary memory address space (just below the 128 megabyte position) where interference with actual memory is least likely. It should be noted that the tag information to be written into cache tag RAM 224A in the 512k-byte cache case could have been chosen to be close to the 256 megabyte boundary of secondary memory and thereby even further minimize the possibility of overlapping actual installed DRAM. However, that would have required that an additional non-cacheable block be defined, and also would have required additional logic in the circuitry of FIG. 17.

The multiplexer 1712 outputs a logic 0 in this cache mode '01' in order to clear the dirty bit corresponding to each cache data line from which information is read.

Modes '10' and '11' are tag RAM test modes. In these modes, multiplexers 1710 and 1712 each select the output of corresponding registers 1706 and 1708 for providing to the tag data bus. Accordingly, by writing desired data into these registers using register locations C4Dh-C4Fh(3:0), a user can have such desired information written to the cache tag RAM 224A and dirty bit RAM 224B. As will be seen, such data will be written to the cache RAMs on the next secondary memory read access.

In cache test mode '11', TAGWB and DRTYWB are inactive and the MCC 213 does not drive the tag data and dirty data buses. Instead, the cache tag RAM 224A and dirty bit RAM 224B drive these buses, and the information provided by these RAMs is clocked into the registers 1706 and 1708 via invertors 1728 and 1730 and multiplexers 1702 and 1704. Although not shown in FIG. 17, the Q outputs of these registers are also selectable onto the host bus HD(3:0) lines 204 when the user reads the registers C4Dh-C4Fh as shown in FIG. 15. In this way, tag and dirty data may be read from the cache tag RAM 224A and dirty bit RAM 224B.

Accordingly, to write desired information to a desired location in cache tag RAM or cache dirty RAM, the following steps are taken. First, the CPU 212 writes '10' into I/O port C32h's bits 1:0 in order to select cache test mode 1 (tag/dirty write). Next, the CPU writes desired data for bits TAG19, TAG27/18, TAG26/17 and TAG25/16 into bits 3:0 of IO port C4Dh. The CPU then writes desired data for TAG(23:20) into bits 3:0 of IO port C4Eh, and then writes desired data for TAG24 and the dirty bit into bits 3 and 0 of IO port C4Fh.

Next, the CPU executes a DRAM read access to any address whose low-order bits contain the desired cache tag RAM 224A address. The MCC 213 will generate TAGWE# and DIRTYWE# as hereinafter described, to write the information to the specified address.

To read tag/dirty data from a desired location in cache tag RAM 224A and dirty bit RAM 224B, the CPU first sets cache test mode '11' by writing '11' to IO port C32h. The CPU then executes a DRAM read access to any address whose low-order bits contain the desired cache address, thereby causing the MCC 213 to read the desired information into the registers 1706 and 1708. The CPU can then read the information by reading bits 3:0 from IO port C4Dh, then reading bits 3:0 from IO port C4Eh, then reading bits 3 and 0 from IO port C4Fh.

FIG. 18 shows logic circuitry in the MCC 213 which generates the TOG1B, TAGWB, DRTYWB, TAGTB, WR0,WR1 and WR2 signals used in FIG. 17. Roughly, it comprises three portions 1802, 1804 and 1806. The portion 1802 generates a TAGW1B signal, the portion 1804 generates a TAGW2B signal and the portion 1806 generates a TAGW3B signal. These signals are combined by AND gates 1808 and 1810 to generate the TAGWB and DRTYWB signals, respectively. In addition to being provided to the circuitry of FIG. 17, these signals also are provided to the TAGWE# and DIRTYWE# MCC output pins for driving the cache tag RAM 224A and dirty bit RAM 224B write enables, respectively.

The portion 1802 comprises an invertor 1812 connected to receive the BRDYB signal generated by MCC 213 and provided to the CPU 212 which indicates the end of a host CPU to local memory cycle. The output of invertor 1812 forms a BRDY signal which is connected to a second input of an OR gate 1814. The output of OR gate 1814 is connected to a first input of a NAND gate 1816, the second input of which is connected to the output of a NOR gate 1818. The two inputs of NOR gate 1818 are connected to receive an END1 signal and a WRB signal, respectively. The END1 signal is high only if the current BRDYB is the last BRDYB in a burst. WRB is the complement of the WR signal in FIG. 17, and is low only for read accesses.

The output of NAND gate 1816 is connected to the D input of a flip-flop 1820, the Q output of which forms the TOG1B signal used in FIG. 17. The QN output of flip-flop 1820 forms a TOG1 signal, which is connected back to the first input of OR gate 1814. TOG1 is also connected to the second input of a three-input NAND gate 1822, the first input of which is connected to the output of an OR gate 1824. A first input of OR gate 1824 is connected to the BRDY signal. The third input of NAND gate 1822 is connected to the output of NOR gate 1818.

The output of NAND gate 1822 is connected to the D input of a flip-flop 1826, the QN output of which forms a TOG2 signal which is fed back to the second input of OR gate 1824. The inverting preset inputs of flip-flops 1820 and 1826 are connected to the output of an AND gate 1828, the two inputs of which are connected to a reset signal and the M386B signal previously referred to.

The TOG2 signal is also connected to the second input of a three-input NAND gate 1830, the first input of which is connected to BRDY and the third input of which is connected to the output of NOR gate 1818. The output of NAND gate 1830 is connected to the D input of flip-flop 1832, the Q output of which forms the TAGW1B signal provided as an input to each of the AND gates 1808 and 1810. The inverting preset input of flip-flop 1832 is connected the RDMIS signal previously referred to, and the clock inputs of each of the flip-flops 1820, 1826 and 1832 are all connected to receive an SCLKB clock signal. SCLKB is a signal derived from, and operating at the same frequency as, the CPU (host) clock. The B suffix in these drawings generally indicates an active low signal, as does an N suffix and a # suffix.

In the portion 1804 of the circuitry of FIG. 18, an OR gate 1834 is provided which has two inputs connected, respectively, to a PARENB signal and a DRDMISB signal. The PARENB signal is a timing signal generated by the MCC 213 to indicate to the DBC 216 to check for parity errors. PARENB becomes active one clock cycle before each BRDY#. It is used in the circuit of FIG. 18 only because its timing is appropriate for the purposes of portion 1804 of the circuit of FIG. 18.

DRDMISB is the complement of a DRDMIS signal, which is RDMIS signal delayed by one host CLK cycle.

The output of OR gate 1834 is connected to the clock input of a flip-flop 1836, the D input of which is connected to a logic 1. The inverting clear input of flip-flop 1836 is connected to the DRDMIS signal. The Q output of flip-flop 1836 is connected, together with the output of OR gate 1834, to respective inputs of an OR gate 1838, the output of which is the TAGW2B signal provided to AND gates 1808 and 1810.

In the portion 1806 of FIG. 18, an XNOR gate 1840 has two inputs connected to receive CACM1 and CACM0. CACM1 and CACM0 are also connected to respective inputs of a two-input NAND gate 1842. The output of XNOR gate 1840 is connected to one input of an OR gate 1844, the other input of which is connected to receive an MDHDCLK signal which provides a pulse which is one CPU clock cycle in duration, indicating a DRAM read access. The output of NAND gate 1842 is connected to one input of a two-input OR gate 1846, the other input of which is connected to receive MDHDCLK. The output of OR gate 1844 is the TAGW3B signal provided to AND gates 1808 and 1810, and the output of OR gate 1846 is the TAGTB signal used in FIG. 17.

The TAGTB signal is also provided as one input to each of three AND gates 1848, 1850 and 1852, the second inputs of which are connected to receive respective WRC4DB, WRC4EB and WRC4FB signals. The WRC4DB, WRC4EB and WRC4FB signals each provide a low-going pulse which is timed to have a rising edge when information from the CPU, to be written into respective register I/O addresses C4Dh, C4Eh and C4Fh, is present on the IXDBi lines. The outputs of AND gates 1848, 1850 and 1852 are the respective WR0, WR1 and WR2 signals used in FIG. 17.

As mentioned, AND gates 1808 and 1810 each receive the signals TAGW1B, TAGW2B and TAGW3B. AND gate 1810 also receives a CAWEB signal, which is the signal provided by other circuitry (not shown) in the MCC 213 which causes data to be written into the cache data RAM 224C. CAWEB is used to generate the CAWE(3:0) cache write enable outputs of the MCC 213.

In addition to responding to simple read accesses by CPU 212, the MCC 213 also accommodates a burst read cycle by the CPU 212. In 486-compatible systems, the CPU 212 has its own internal cache memory with a 16-byte line width. The most frequent read access to which the MCC 213 responds therefore is a CPU internal cache line fill which is most expeditiously handled by bursting four double words in sequence to the CPU. If the data is present in the cache memory 224 at the time it is requested by the CPU 212, then it is simply provided to the CPU 212 as quickly as possible. But if the MCC 213 must fetch the data from secondary memory, and if it is from an address which is presently cacheable in cache memory 224, then each double word is written into the cache data RAM 224C at the same time it is provided to the CPU 212.

The process of writing data in a burst to cache as it is provided to the CPU presents a problem if for some reason the CPU does not complete the four-cycle burst, since this would leave a line of data in cache data RAM 224C of which fewer than all of the double words are properly associated with the information in the cache tag RAM 224A. Accordingly, the MCC 213, on a burst mode read access, will write the invalidating tag information (the same invalidating tag information which is written to the cache tag RAM 224A in cache mode '01') when the first double word in the burst is written to cache data RAM 224C. Only when the fourth double word in the burst is written to cache data RAM 224C will the correct tag information be written to cache tag RAM 224A. In this way, should the burst for some reason fail to complete, the cache memory 224 will be left with invalidating information in the cache tag RAM 224A.

Figure 19:
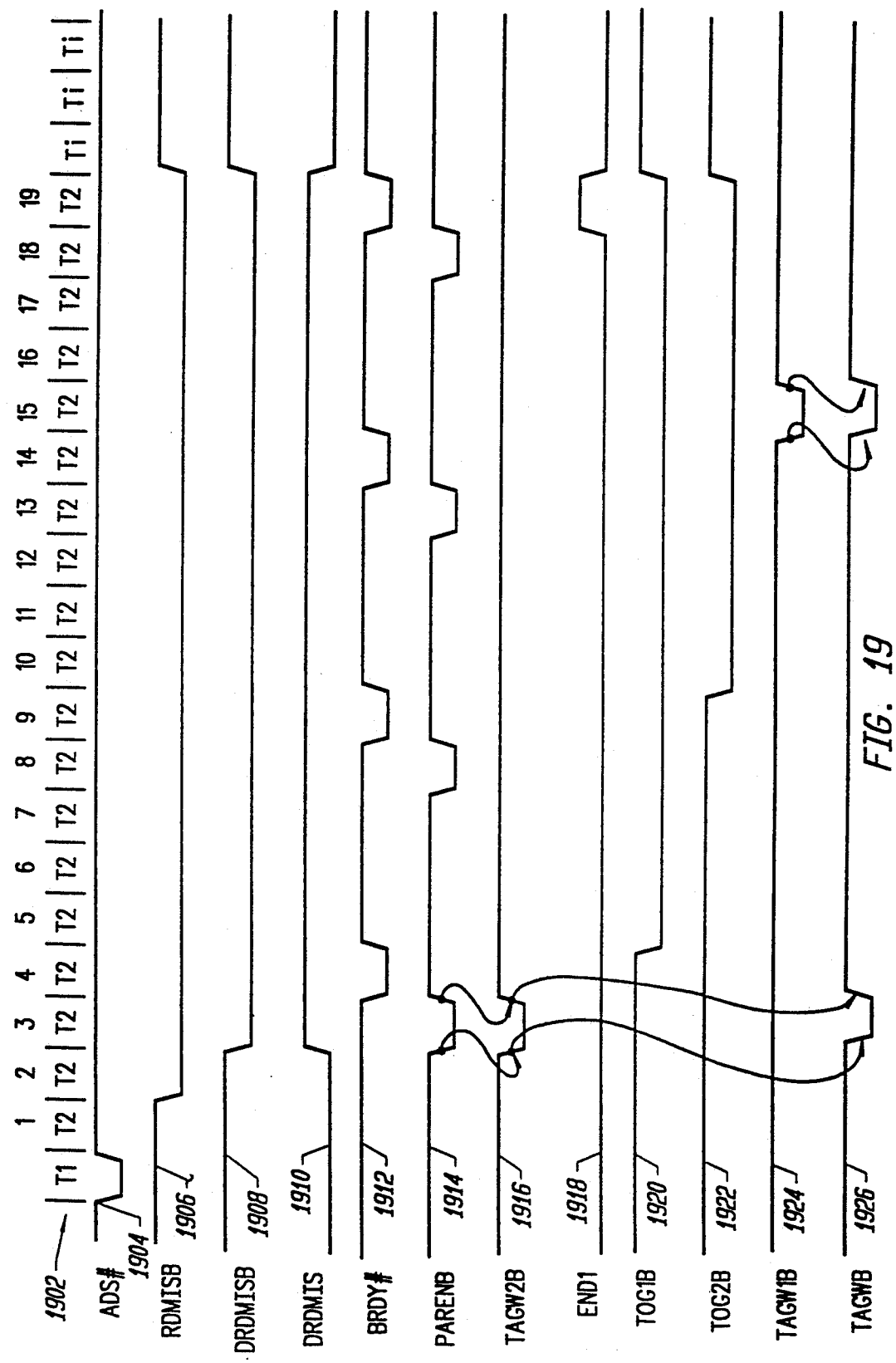
FIG. 19 is a timing diagram useful for understanding a portion of FIG. 18.

FIG. 19 is a timing diagram indicating how the circuitry of FIG. 18 operates during a burst read to the CPU 212 when cacheing is enabled for normal operation (register 32h(1:0)='00'). The details of a burst memory read cycle on the host bus 201 are described in the above-mentioned i486 Microprocessor Hardware Reference Manual, chapter 3. Roughly, the CPU 212 enters a state T1 at the beginning of the bus cycle, at which time it asserts ADS#. The second and all subsequent clock cycles of the burst memory read cycle occur while the CPU 212 is in its state T2. In FIG. 19, line 1902 indicates the processor state for each host bus clock cycle in the burst. For convenience, since state T2 occurs many times, line 1902 also counts the T2s during the burst.

In prior generations of the Intel 8X86 processor series, external circuitry (such as a chipset) would assert RDY# to the CPU when the requested data was available to be latched into the CPU. In 486-compatible processors, external circuitry (such as the MCC 213) can instead assert BRDY# ("burst ready") to indicate not only that the initially requested data is available to be latched into the CPU, but also that the external circuitry is capable of providing burst mode transfers. The CPU de-asserts the BLAST# signal following ADS# if a burst mode transfer is requested, and then asserts BLAST# when the next transfer in the burst is to be the last transfer in the burst. Accordingly, in a typical four double word burst read cycle, the processor will de-assert BLAST# following ADS#, and then re-assert BLAST# prior to the time that the external circuitry asserts BRDY# for the fourth time. When BLAST# is asserted, the external circuitry knows that the next BRDY# that it asserts to the CPU will terminate the burst transfer.

As indicated in waveform 1904 in FIG. 19, the CPU 212 asserts ADS# during processor state T1. By the beginning of the second T2, for example, it will be assumed that the cache match comparator has determined that a cache miss has occurred in cache memory 224. The internal MCC 213 signal RDMISB therefore goes low (active) at the beginning of the second T2 as indicated in waveform 1906. Similarly, the one cycle-delayed versions of RDMISB, namely DRDMISB and DRDMIS, go active at the beginning of the third T2 as indicated in waveforms 1908 and 1910. At a subsequent time, depending on wait states and the like, the MCC activates BRDY# to indicate that the first double word is available to be clocked into the CPU 212. In FIG. 19, it is assumed that BRDY# occurs in the fourth T2. The MCC 213 generates the parity enable strobe PARENB one host clock cycle before BRDY# as indicated in waveform 1914. As indicated above, PAREN# is provided to the DBC 216 to enable parity checking of the information just read from secondary memory, a task unrelated to the present invention. However, PARENB provides a convenient timing pulse before each BRDY# which is used as hereinafter described. After the fourth T2, as long as BLAST# remains unasserted, the MCC 213 will strobe BRDY# every fifth T2 until BLAST# is asserted. PARENB will also continue to strobe one T2 prior to each of the BRDY#s.

In response to the CPU's assertion of BLAST# some time after the third BRDY#, an internal MCC END1 signal goes high concurrently with the fourth BRDY#. The CPU ends the cycle after that last BRDY# (after the 19th T2), and then proceeds to an idle state Ti as indicated in line 1902. MCC 213 also deactivates RDMISB, DRDMISB and DRDMIS after the last BRDY# as indicated in waveforms 1906, 1908 and 1910.

Referring to portion 1804 of the circuit of FIG. 18, it can be seen that flip-flop 1836 will be cleared by the DRDMIS signal at least through the second T2. Up to that time, DRDMISB and PARENB are high, therefore forcing the OR gate 1834 output and therefore TAGW2B high. DRDMISB and PARENB go low in the third T2. Since the Q output of flip-flop 1836 is still low from having been cleared, TAGW2B will therefore go low in the third T2. This is shown in waveform 1916 of FIG. 19. When PARENB returns high, so does TAGW2B. TAGW2B then remains high for all the next four occurrences of PARENB since the trailing edge of the first PARENB caused flip-flop 1836 to clock in a 1. Flip-flop 1836 will be cleared only when DRDMIS returns low after the end of the burst cycle.

Referring to portion 1802 of the circuit of FIG. 18, it can be seen that the TAGW1B output of flip-flop 1832 will be initially high since it is constantly being preset by RDMIS at least until the beginning of the second T2. The output of AND gate 1828 will preset the flip-flops 1820 and 1826 only on receipt of the RESETB signal or if the MCC 213 is strapped for 386-compatible operation. 386-compatible processors do not support burst mode transfers and in this situation it will be seen that TAGW1B remains high due to the constant low value on the TOG2 output of flip-flop 1826 provided to NAND gate 1830. Assuming 486-compatible operation, however, flip-flops 1820 and 1826 will never be preset except on RESETB, and both TOG1B and TOG2B will begin at a logic 1 as indicated in waveforms 1920 and 1922 of FIG. 19.

At the leading edge of the first BRDYB, the BRDY signal goes high and forces a logic 1 on the outputs of OR gates 1814 and 1824. The output of NOR gate 1818 is also high at this time, since we are assuming that END1 is low until the fourth BRDY. WRB is low to indicate that a read operation is taking place. Accordingly, on the next rising edge of SCLKB following assertion of BRDYB, flip-flop 1820 will load in a 0, thereby bringing TOG1B low. TOG2B will remain high at this time since the logic 0 TOG1 signal continued to force a logic 1 at the D input of flip-flop 1826 at the time of such SCLKB rising edge. TOG1B going low also brings TOG1 high, thereby maintaining the output of OR gate 1814 at a logic 1 even after BRDY returns low. It can be seen that flip-flop 1820 will continue to load in a logic 0 (thereby maintaining TOG1B low) until the first SCLKB rising edge following assertion of END1. At that time, flip-flop 1820 will load in a logic 1 and TOG1B will return high. This is shown in the waveform 1920. Thus, the withdrawal of TOG1B will coincide with the trailing edge of the fourth BRDY# pulse.

After TOG1B goes low in the fifth T2, flip-flop 1826 will load in a logic 0 in response to the next SCLKB rising edge which occurs while BRDY is high. Accordingly, TOG2B will go low together with the trailing edge of the second BRDY# as indicated in waveform 1922. Since this brings TOG2 high, it can be seen that similarly to flip-flop 1820, flip-flop 1826 will continue to load in a logic 0 until the first SCLKB rising edge following assertion of END1. As shown in waveform 1922, TOG2B will therefore terminate together with the termination of TOG1B.

Flip-flop 1832 will load in a logic 0 only in response to the first SCLKB rising edge which occurs while END1 is low, TOG2B is low, and BRDY is high. Thus, TAGW1B will go low for one host clock cycle following the third BRDY, i.e., in the 15th T2. It will not go low again after the fourth BRDY#, since by that time END1 is high.

Assuming TAGW3B is high, which will be the case when normal cacheing is enabled, it can be seen that AND gate 1808 will bring TAGWB low at the time TAGW2B goes low, and also at the time that TAGW1B goes low. The circuitry of FIG. 18 therefore activates TAGWB once before the first BRDY# of a burst read cycle and again before the fourth BRDY# as shown in waveform 1926. Similarly, assuming CAWEB remains high during the entire burst read transfer, the circuitry of FIG. 18 will activate DRTYWB simultaneously with TAGWB.

The information which is written to the cache tag RAM 224A at the time of each TAGWB is determined, of course, by the circuitry of FIG. 17. Referring to FIG. 17, therefore, it can be seen that at the time of the first TAGWB (in the third T2), RDMIS is high, TOG1B is high, and M386B is high. OR gate 1716 will therefore provide a logic 1 to the low-order select input of each of the multiplexers 1710 (the high-order select bit being 0), thereby selecting cache line invalidating information onto the tag data bus for writing to cache tag RAM 224A. At the time of the second TAGWB (in the 15th T2), TOG1B is low. OR gate 1716 will therefore provide CACM0 (which is low when cacheing is enabled) to the low-order select inputs of the multiplexers 1710, thereby selecting valid cache tag information onto the tag data bus for writing to cache tag RAM 224A.

Accordingly, the circuitry of FIGS. 17 and 18 will write cache line invalidating information into the cache tag RAM 224A when the first double word of a burst read transfer is written to the corresponding line of cache data RAM 224C, and valid tag information will be written to the cache tag RAM 224A only when the fourth double word of the burst is written to the corresponding line in cache data RAM 224C. It will be understood that a different embodiment may also be designed in which the invalidating information is written for all of the first, second and third double words received, with the valid tag information being written for the fourth double word in the burst.

Returning to FIG. 18, it will now be described how TAGWB and DRTYWB are generated by circuit portions 1806, and also how the TAGTB signal used in FIG. 17 is generated. In the cache tag test mode '10', CACM1=1 and CACM0=0. The output of XNOR gate 1840 will therefore be low in this mode, allowing MDHDCLK to propagate through OR gate 1844 to generate TAGW3B. As mentioned above, MDHDCLK is the signal provided by the MCC 213 to the DBC 216 to clock data from the MD bus 217 through to the HD bus 204. It is an active low pulse which occurs in response to each read access to main memory. Since XNOR gate 1840 will output a logic 0 also in cache disable mode '01', TAGW3B, and therefore TAGWB and DRTYWB, will carry an active low pulse in response to each read access to main memory, when the cache mode select bits in register C32h are set to '01' (disable cacheing) or '10' (test mode 1). TAGTB remains high in both of those modes. Referring to FIG. 17, it can be seen that when the cache mode select bits are set at '01', the multiplexers 1710 select the invalidating information to be written to the cache tag RAM 224A at the time of each such TAGWB, and when the cache mode select bits are set at '10', the multiplexers 1710 select the information from registers 1706 to be written to cache tag RAM 224A on such TAGWB. Multiplexer 1712 selects the value to clear the dirty bit in dirty bit RAM 224B when the cache mode select bits are set at '01', and selects the value from register 1708 when the cache mode select bits are set at '10' to be written into the dirty bit in dirty bit RAM 224B.

In cache mode '11', referring to FIG. 18 again, it can be seen that the TAGTB signal will go low together with the low-going MDHDCLK pulses. TAGTB will remain high for all of the cache modes except mode '11'. Referring to FIG. 17, the multiplexers 1702 and 1704 will always select the information from the IXDBi leads for providing to the D inputs of registers 1706 and 1708, except during the low going MDHDCLK pulses while cache mode '11' is selected. Since the signals WR0, WR1 and WR2 provide a rising edge synchronously with the rising edge of each MDHDCLK, the information from the IXDBi lines will be loaded into the appropriate group of registers 1706, 1708. The TAGW3B, and therefore the TAGWB signal, remains high in cache mode '11' in accordance with the circuitry of FIG. 18. Accordingly, in this mode '11', the tag and dirty bus output buffers 1720 and 1722 will remain disabled, allowing the tag and dirty data in cache tag and dirty RAMs 224A and 224B to be read into the MCC 213 via invertors 1728 and 1730 and multiplexers 1702 and 1704. The data is written into the registers 1706 and 1708 in response to each read access to secondary memory, specifically in response to the rising edge of MDHDCLK as it appears on WR0, WR1 and WR2. The write enable to cache data RAM 224C is not activated in cache mode '11'.

As previously mentioned, the ability of the FIG. 14 embodiment to read and write information directly to or from cache tag RAM, in addition to permitting direct testing of such cache tag RAM much in the same way that DRAM is tested during power-up, also permits a reliable means of power-up cache sizing. In the past, any automatic cache sizing would have been done by writing information to the cache data RAM, reading it back and comparing it to the data which was written. The only method available for writing information to the cache data RAM, however, was to write data to DRAM and then force a cache read miss so as to have that data read back and written to the cache data RAM. This method undesirably depends on the reliability of the DRAM for its accuracy.

In accordance with another aspect of the invention, automatic cache sizing is performed by reading and writing information directly to and from the cache tag RAM. In particular, the following steps may be performed:

1. Set register C32h(3:2)='10' (tag write mode).
2. Set registers C4Dh-C4Fh with 0.
3. Read memory location 0, to write the contents of C4Dh-C4Fh into the cache tag RAM 224A entry corresponding to cache data RAM location 0.
4. Set registers C4Dh-C4Fh with Ah.
5. Read memory location 10000 h (64 k).
6. Set register C32h(3:2)='11' (tag memory read mode).
7. Read memory location 0, to read the contents of tag location 0 into registers C4Dh-C4Fh.
8. Test the contents of registers C4Dh-C4Fh:
   if the value is A, then a 64 k cache is installed;
   if the value is 0, then the installed cache is 128 k or larger;
   if the value is neither A nor 0, then no cache is installed.
9. Repeat steps 1-8, changing the memory read address in step 5 to address location 20000 h (128 k).
10. If the value in registers C4Dh-C4Fh is A, then a 128 k-byte cache is installed; if the value is 0, then the installed cache is 256 k bytes or larger.

11. Repeat steps 1-8, changing the memory read address in step 5 to 40000 h (256 k).

12. If the value in registers C4Dh-C4Fh is A, then the installed cache is 256 k; if the value is 0, then the installed cache is 512 k bytes.

The invention has been described with respect to particular embodiments thereof, and numerous modifications are possible within its scope.

I claim:

1. Cache memory control apparatus for use with a cache memory having a plurality of tag data leads, with a memory bus having a plurality of bus address leads and being a first source of tag data and with a second source of tag data different from said memory bus address leads, comprising:
   a plurality of cache memory control apparatus tag data leads, each coupled to a respective one of said cache memory tag data leads;
   a plurality of cache memory control apparatus address leads, each coupled to a respective one of a subset of said bus address leads; and
   a multiplexer having a first input, a second input and an output, said first input being coupled to said control apparatus address leads, said second input being coupled to said second source of tag data and said multiplexer output being coupled to said control apparatus tag data leads.

2. Apparatus according to claim 1, for use further with a secondary memory having a predefined non-cacheable address range, wherein said second source comprises a source of a first value which, when written as a tag in said cache memory, associates a corresponding data line in said cache memory with a secondary memory address which is within said predefined non-cacheable address range.

3. Apparatus according to claim 1, wherein said second source comprises a register bit which is programmable with a desired value.

4. Apparatus according to claim 2, further comprising a third source of tag data including a register bit which is programmable with a desired value, said multiplexer further having a third input coupled to said third source of tag data.

5. Apparatus according to claim 1, wherein said memory bus further has a plurality of bus data leads, further comprising:
   a plurality of cache memory control apparatus data leads, each coupled to a respective one of said bus data leads; and
   a data path providing information from said cache memory control apparatus tag data leads to said cache memory control apparatus data leads.

6. Cache memory control apparatus, for use with a cache memory having a plurality of tag data leads and with a memory bus having a plurality of bus data leads and a plurality of bus address leads, comprising:
   a plurality of first data leads coupled to respective ones of said bus data leads;
   a plurality of second data leads coupled to respective ones of said tag data leads;
   a plurality of first address leads coupled to respective ones of a subset of said bus address leads;
   a first data path providing information from said first address leads to said second data leads; and
   a second data path providing information from said second data leads to said first data leads
   wherein said second data path further comprises: a register readable via said first data leads; and
   means for writing said information from said second data leads into said register.

7. Apparatus according to claim 6, wherein said register is further writable via said first data leads, further comprising a third data path providing information from said register to said second data leads.

8. Apparatus according to claim 7 for use further with a secondary memory having a predefined non-cacheable address range, further comprising a fourth data path for providing to said second data leads a first value which, when written as a tag in said cache memory, associates a corresponding data line in said cache memory with an address in said secondary memory which is within said predefined non-cacheable address range.

* * * * *

UNITED STATES PATENT AND TRADEMARK OFFICE
CERTIFICATE OF CORRECTION

PATENT NO. : 5,287,481
DATED : February 15, 1994
INVENTOR(S) : Fong-Lu Lin

It is certified that error appears in the above-indentified patent and that said Letters Patent is hereby corrected as shown below:

Col. 51, line 13, after the words "tag data", insert a comma --,--.

Col. 51, line 24, before the words "control apparatus", insert --cache memory--.

Col. 51, lines 26-27, before the words "control apparatus", insert --cache memory--.

Col. 52, line 25, after the words "data leads", insert a semi-colon --;--.

Signed and Sealed this

Twelfth Day of July, 1994

Attest:

BRUCE LEHMAN

Attesting Officer

Commissioner of Patents and Trademarks